(12) United States Patent
Lee et al.

(10) Patent No.: US 11,982,442 B2
(45) Date of Patent: *May 14, 2024

(54) SYSTEM AND METHOD FOR BIOMASS COMBUSTION

(71) Applicant: Morgan State University, Baltimore, MD (US)

(72) Inventors: Seong W. Lee, Baltimore, MD (US); Xuejun Qian, Baltimore, MD (US); Yulai Yang, Baltimore, MD (US); Raghul Kumar Chandrasekaran, Baltimore, MD (US); Oludayo Alamu, Baltimore, MD (US); Blaise Kalmia, Baltimore, MD (US)

(73) Assignee: Morgan State University, Baltimore, MD (US)

( * ) Notice: Subject to any disclaimer, the term of this patent is extended or adjusted under 35 U.S.C. 154(b) by 398 days.

This patent is subject to a terminal disclaimer.

(21) Appl. No.: 17/195,790

(22) Filed: Mar. 9, 2021

(65) Prior Publication Data
US 2021/0190311 A1 Jun. 24, 2021

Related U.S. Application Data

(63) Continuation-in-part of application No. 16/378,986, filed on Apr. 9, 2019, now abandoned, which is a
(Continued)

(51) Int. Cl.
*F23C 10/20* (2006.01)
*F23C 10/12* (2006.01)
(Continued)

(52) U.S. Cl.
CPC ............. *F23C 10/20* (2013.01); *F23C 10/12* (2013.01); *F23G 5/14* (2013.01); *F23G 5/30* (2013.01);
(Continued)

(58) Field of Classification Search
None
See application file for complete search history.

(56) References Cited

U.S. PATENT DOCUMENTS 2,818,935 A * 1/1958 Kemmetmuller ..... F28D 7/0058
55/347
3,577,938 A * 5/1971 Muirhead ................. F23G 5/30
110/165 R
(Continued)

*Primary Examiner* — David J Laux
(74) *Attorney, Agent, or Firm* — Whiteford, Taylor & Preston, LLP; Gregory M. Stone

(57) ABSTRACT

Disclosed is a system and method for the combustion of biomass material employing a swirling fluidized bed combustion (SFBC) chamber, and preferably a second stage combustion carried out in a cyclone separator. In the combustion chamber, primary air is introduced from a bottom air box that fluidizes the bed material and fuel, and staged secondary air is introduced in the tangential direction and at varied vertical positions in the combustion chamber so as to cause the materials in the combustion chamber (i.e., the mixture of air and particles) to swirl. The secondary air injection can have a significant effect on the air-fuel particle flow in the combustion chamber, and more particularly strengthens the swirling flow, promotes axial recirculation, increases particle mass fluxes in the combustion chamber, and retains more fuel particles in the combustion chamber. This process increases the residence time of the particle flow. The turbulent flow of the fuel particles and air is well mixed and mostly burned in the combustion chamber, with any unburned waste and particles being directed to the cyclone separator, where such unburned waste and particles are burned completely, and flying ash is divided and collected in a container connected to the cyclone separator, while dioxin production is significantly minimized if not altogether eliminated. A Stirling engine along with cooling system and engine control box is integrated with the SFBC chamber to produce electricity from the waste combustion
(Continued)

process. Residual heat in the flue gas may be captured after the combustion chamber and directed to a fuel feeder to first dry the biomass. System exhaust is directed to a twisted tube-based shell and tube heat exchanger (STHE) and may produce hot water for space heating.

20 Claims, 15 Drawing Sheets

Related U.S. Application Data continuation of application No. 15/056,179, filed on Feb. 29, 2016, now Pat. No. 10,253,974.

(60) Provisional application No. 63/117,732, filed on Nov. 24, 2020, provisional application No. 63/117,744, filed on Nov. 24, 2020, provisional application No. 63/112,717, filed on Nov. 12, 2020, provisional application No. 63/089,760, filed on Oct. 9, 2020, provisional application No. 62/121,843, filed on Feb. 27, 2015.

(51) Int. Cl.
    F23G 5/14    (2006.01)
    F23G 5/30    (2006.01)
    F23G 5/44    (2006.01)
    F23G 5/46    (2006.01)
    F23G 5/50    (2006.01)

(52) U.S. Cl.
    CPC ............ *F23G 5/444* (2013.01); *F23G 5/46* (2013.01); *F23G 5/50* (2013.01); *F23G 2200/00* (2013.01); *F23G 2202/10* (2013.01); *F23G 2203/50* (2013.01); *F23G 2206/10* (2013.01); *F23G 2207/101* (2013.01); *F23G 2207/102* (2013.01); *F23G 2207/30* (2013.01); *F23G 2209/262* (2013.01)

(56) References Cited

U.S. PATENT DOCUMENTS

| | | | | |
|---|---|---|---|---|
| 3,834,327 A * | 9/1974 | Hellstrom | ............... | F23G 7/105 110/244 |
| 3,941,065 A * | 3/1976 | Albrecht | ................. | F27B 15/00 110/252 |
| 4,075,953 A * | 2/1978 | Sowards | ................... | F23G 5/30 34/585 |
| 4,147,115 A * | 4/1979 | Leppert | ..................... | F23G 5/32 110/244 |
| 4,159,000 A * | 6/1979 | Iwasaki | ..................... | F23G 5/32 110/259 |
| 4,442,796 A * | 4/1984 | Strohmeyer, Jr. | ... | F22B 31/0084 431/170 |
| 4,457,289 A * | 7/1984 | Korenberg | ............... | F23C 10/02 431/170 |
| 4,469,050 A * | 9/1984 | Korenberg | ............... | C10J 3/526 122/4 D |
| 4,548,138 A * | 10/1985 | Korenberg | ................. | C10J 3/86 110/244 |
| 4,694,894 A * | 9/1987 | Kito | ........................ | F28F 13/02 122/142 |
| 4,699,211 A * | 10/1987 | Geary | ........................ | F28F 9/22 165/DIG. 420 |
| 4,785,744 A * | 11/1988 | Fontaine | .................... | F23L 9/00 110/297 |
| 4,867,079 A * | 9/1989 | Shang | .................... | F23C 10/002 431/170 |
| 5,178,531 A * | 1/1993 | Naito | ..................... | F23C 10/002 431/170 |
| 5,181,560 A * | 1/1993 | Burn | ........................ | F28F 1/426 165/177 |
| 5,251,684 A * | 10/1993 | Andrews | ................. | F27B 9/142 164/456 |
| 6,352,040 B1 * | 3/2002 | Voorhees | ................. | F23G 7/003 110/211 |
| 6,976,439 B2 * | 12/2005 | Uchida | ..................... | F23G 5/12 110/308 |
| 2008/0201980 A1 * | 8/2008 | Bullinger | ................... | C10L 9/08 209/139.1 |
| 2009/0314464 A1 * | 12/2009 | Farrell | ................... | F24H 7/0466 237/63 |
| 2010/0018246 A1 * | 1/2010 | Wolfe, IV | ............... | F28D 7/022 165/154 |
| 2010/0083883 A1 * | 4/2010 | Hofer | ....................... | F23L 1/00 110/297 |
| 2011/0253341 A1 * | 10/2011 | Al-Otaibi | ................... | F28F 9/22 165/69 |

* cited by examiner

Diagram of the Bubble-Cap Primary Air Distributor

Configuration of the Secondary Air Nozzle

SYSTEM AND METHOD FOR BIOMASS COMBUSTION

CROSS REFERENCE TO RELATED APPLICATION

This application is a continuation-in-part of copending U.S. patent application Ser. No. 16/378,986 entitled "SYSTEM AND METHOD FOR BIOMASS COMBUSTION" filed with the U.S. Patent and Trademark Office on Apr. 9, 2019, which application is a continuation of U.S. patent application Ser. No. 15/056,179 entitled "SYSTEM AND METHOD FOR BIOMASS COMBUSTION" filed with the U.S. Patent and Trademark Office on Feb. 29, 2016, now U.S. Pat. No. 10,253,974 issued on Apr. 9, 2019, which is based upon and claims benefit of copending U.S. Provisional Patent Application Ser. No. 62/121,843 entitled "Method and Design of the Ultra-Clean Mobile Combustor for Waste Biomass and Poultry Litter Disposal," filed with the U.S. Patent and Trademark Office on Feb. 27, 2015 by the inventor herein. This application is also based upon and claims benefit of copending U.S. Provisional Patent Application Ser. No. 63/089,760 entitled "Efficient and Innovative Drying Process of Poultry Litter," filed with the U.S. Patent and Trademark Office on Oct. 9, 2020; U.S. Provisional Patent Application Ser. No. 63/112,717 entitled "Shell and Twisted Tube-Based Heat Exchanger System," filed with the U.S. Patent and Trademark Office on Nov. 12, 2020; U.S. Provisional Patent Application Ser. No. 63/117,744 entitled "Space Heating Method for a Poultry Farm," filed with the U.S. Patent and Trademark Office on Nov. 24, 2020; and U.S. Provisional Patent Application Ser. No. 63/117,732 entitled "Electricity and Thermal Energy Generation Method Using the Combustor and the Stirling Engine," filed with the U.S. Patent and Trademark Office on Nov. 24, 2020. The specifications of each of the foregoing applications are incorporated herein by reference in their entireties.

FIELD OF THE INVENTION

This invention relates to systems and methods for fluidized bed combustion, and more particularly to a fluidized bed combustion system and method optimized for burning biomass wastes and poultry litter in an environmentally-friendly manner, wherein such system is used to produce electricity using a Stirling engine, to produce hot water using a shell and tube heat exchanger, to dry biomass fuel, and more particularly poultry litter, and to provide space heating particularly for poultry farms that may be used as the source of the biomass processed by the fluidized bed combustion system and method.

BACKGROUND OF THE INVENTION

The consolidation and industrialization of the poultry industry over the last 50 years has resulted in highly concentrated regional poultry operations. Traditionally, farmers managed the manure or litter associated with poultry production by spreading it on cropland fields. However, as the industry consolidated, operations became highly regionally concentrated, and cropland diminished, this waste disposal method became less viable. For example, in the Maryland-Delaware region, 523 million chickens are now produced annually, generating approximately 42 million cubic feet of chicken waste each year, such that chickens outnumber people in the region by as much as 400 to 1. With the assumption of 1.1 to 1.4 tons per 1,000 birds, U.S. poultry waste production increased from 8.4. billion (in 2012) to 8.9 billion (in 2017). This high concentration of waste causes eutrophication (e.g., runoff of nitrogen, phosphorus, and potassium), particularly along the shores of the Chesapeake Bay, the largest estuary system in the United States, creating an urgent need for efficient, clean, environmentally friendly chicken waste disposal approaches and systems.

The United Nations and the U.S. Federal Government have identified agriculture as the biggest user of water and a major polluter of water. In fact, agriculture has been identified as the single largest source of pollutants for rivers, lakes, and estuaries in the U.S. The industrialization of agriculture has resulted in such high concentrations of animal waste such that conventional disposal methods are no longer adequate or viable (i.e., spreading on fields). Thus, there is an urgent need for environmentally safe and economically viable approaches to disposing of agricultural waste (i.e., animal waste). This need, in combination with global demand for clean, low-cost, renewable energy, has fueled interest in biomass-to-energy conversion technologies, including for use in disposing of high concentrations of animal waste, which becomes even more appealing given recently implemented regulations that restrict the use of chicken litter as fertilizer on significant acreage. Chicken litter is one type of animal waste and biomass and includes a large portion of the bedding materials (e.g., rice husk, sawdust) in the manure and spilled waste feed. However, due to the relatively low energy density of biomass, the economics of biomass-to-energy conversion technologies have been challenging (e.g., fuel collection and transportation costs can be high relative to energy density; high moisture content adds to transportation costs and reduces burn efficiencies). Thus, there remains a need for sustainable solutions that can reduce the cost of converting biomass into energy and/or increase the efficiency of the combustion process.

Fluidized bed combustion systems are often used for burning biomass fuel. Most of the existing fluidized bed combustion apparatus known to the inventor have only a single level secondary injection of air in the fixed tangential direction to facilitate a turbulent or swirling flow, as shown in U.S. Pat. No. 5,105,917 to Harada et al., and in U.S. Pat. No. 8,161,917 to Yang et al., the specifications of which are incorporated herein by reference in their entireties. Certain systems disclose multiple secondary air supply ports, such as the system shown in European Patent Publication No. 0 458 967 A1. Still other systems disclose methods for incinerating waste using a two-level swirling flow fluidized bed without tangential flow for suppressing re-synthesis of dioxins produced during incineration and the removal of a suspended particulate material, such as the system disclosed in International PCT Publication No. WO/2010/010630. The specifications of each of the foregoing references are incorporated herein by reference in their entireties. However, widespread commercial acceptance of such prior systems has been lacking, due to an inability to reach sufficiently high combustion efficiencies and minimization of noxious emissions. Thus, there remains a need in the art for fluidized bed combustion systems and methods capable of efficiently and cleanly disposing of biomass materials.

SUMMARY OF THE INVENTION

Disclosed is a system and method for ultra-clean and preferably mobile combustion, particularly configured for burning biomass and poultry litter in an environmentally friendly manner (i.e., so as to reduce emissions of pollutants), which system and method provides high combustion efficiency using equipment of compact design and that is easy to operate.

In accordance with certain aspects of an embodiment of the invention, the system carries out preferably a two-step combustion process, namely, a first stage combustion carried out in an advanced swirling fluidized bed combustion (SFBC) chamber, and a second stage combustion carried out in a cyclone separator. In the combustion chamber, primary air is introduced from a bottom air box that fluidizes the bed material and fuel, and staged secondary air is introduced in the tangential direction and at varied vertical positions in the combustion chamber so as to cause the materials in the combustion chamber (i.e., the mixture of air and particles) to swirl. The secondary air increases the residence time of the particle flow. The turbulent flow of the fuel particles and air is well mixed and mostly burned in the combustion chamber. Any waste and particles that remain unburned in the combustion chamber are directed to the cyclone separator, where such unburned waste and particles are burned completely, and flying ash is divided and collected in a container connected to the cyclone separator, while dioxin production is significantly minimized if not altogether eliminated. The collected ash and char may optionally be used as fertilizer. The system exhaust, in the form of high temperature flue gas, is directed to a pollutant control unit and heat exchanger, where the captured heat may be put to useful work, such as by generating steam for delivery to a turbine, powering a Stirling engine, or such other energy generation devices as may be apparent to those skilled in the art, or for direct heating of process materials, such as water, feed stock (for drying the same), or the like, or such other direct heat application processes as may be apparent to those skilled in the art.

The system and method set forth herein have the potential to significantly improve the economics of biomass-to-energy operations, by dramatically improving the efficiency of the combustion process while reducing capital and operating costs. The single chamber design in comparison to the classic combustor system with multiple chambers contributes to lower capital costs. This novel system yields a more efficient burn rate and less solid and gaseous waste than conventional systems for biomass waste disposal.

Relative to other biomass combustion systems, the system and method disclosed herein is expected to have a higher electrical output, lower capital cost, lower maintenance costs, and greater flexibility regarding fuel sources and conditions. Thus, the system and method set forth herein has the potential to significantly improve the economics of biomass-to-energy operations. In a particularly preferred embodiment, a system and method operating in accordance with the disclosure herein would have a commercial electrical power rating of 50 MWe, would carry a capital cost of $3,000-$3,200 per kW, and would carry operating and maintenance costs of $15-$20/ton of feed, thus offering a clean, high efficiency, and affordable method to dispose of biomass and poultry litter while generating energy.

Moreover, fossil fuel depletion, environmental damages, strict regulations and policies have shifted energy production goals from fossil fuels towards use of a variety of renewable energy resources, such as biomass. Biomass combustion plays a major contribution towards energy generation because biomass has a $CO_2$ neutral effect during the photosynthesis and combustion process. Poultry litter is one type of biomass and animal waste occurring during the poultry farming process. Capture of the heat generated during those processes to put that heat to useful work as described herein (e.g., for power generation through a Stirling engine, through heat transfer to radiators for heating occupied spaces, etc.) furthers these goals as well.

In accordance with certain aspects of an embodiment of the invention, a system for fluidized bed combustion is disclosed comprising a combustion chamber, the combustion chamber further comprising a primary air distribution and delivery system configured to provide vertical airflow through the combustion chamber, and a secondary air distribution and delivery system configured to provide a plurality of vertically displaced, horizontally aligned, tangential airflows in the combustion chamber; a biomass feeder in communication with an interior of the combustion chamber and positioned to deliver biomass material to the interior of the combustion chamber at a location above the primary air distribution and delivery system and below the secondary air distribution and delivery system; and a shell tube and heat exchanger comprising a plurality of twisted tubes, a plurality of baffles, and a cylindrical shell around the twisted tubes and the baffles, wherein the shell tube and heat exchanger receives flue gas from the combustion chamber and is configured to collect heat from the flue gas as it flows through the cylindrical shell.

In accordance with further aspects of an embodiment of the invention, a system for fluidized bed combustion is disclosed comprising a combustion chamber, the combustion chamber further comprising a primary air distribution and delivery system configured to provide vertical airflow through the combustion chamber, and a secondary air distribution and delivery system configured to provide a plurality of vertically displaced, horizontally aligned, tangential airflows in the combustion chamber; a biomass feeder in communication with an interior of the combustion chamber and positioned to deliver biomass material to the interior of the combustion chamber at a location above the primary air distribution and delivery system and below the secondary air distribution and delivery system; and a heat engine in thermal contact with the combustion chamber and configured to generate electrical power and heat energy from heat generated inside of the combustion chamber.

In accordance with still further aspects of an embodiment of the invention, a system for fluidized bed combustion is disclosed comprising a combustion chamber, the combustion chamber further comprising a primary air distribution and delivery system configured to provide vertical airflow through the combustion chamber, and a secondary air distribution and delivery system configured to provide a plurality of vertically displaced, horizontally aligned, tangential airflows in the combustion chamber; a biomass feeder in communication with an interior of the combustion chamber and positioned to deliver biomass material to the interior of the combustion chamber at a location above the primary air distribution and delivery system and below the secondary air distribution and delivery system; and a fuel drying system, the fuel drying system further comprising an air conduit wrapping around and in thermal contact with the combustion chamber and a blower at an inlet of the air conduit, the air conduit having a plurality of outlets with an air injection nozzle at each outlet and positioned to direct heat from the combustion chamber to biomass prior to entry of the biomass into the combustion chamber.

BRIEF DESCRIPTION OF THE DRAWINGS

The numerous advantages of the present invention may be better understood by those skilled in the art by reference to the accompanying drawings in which.

DETAILED DESCRIPTION OF THE PREFERRED EMBODIMENTS

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
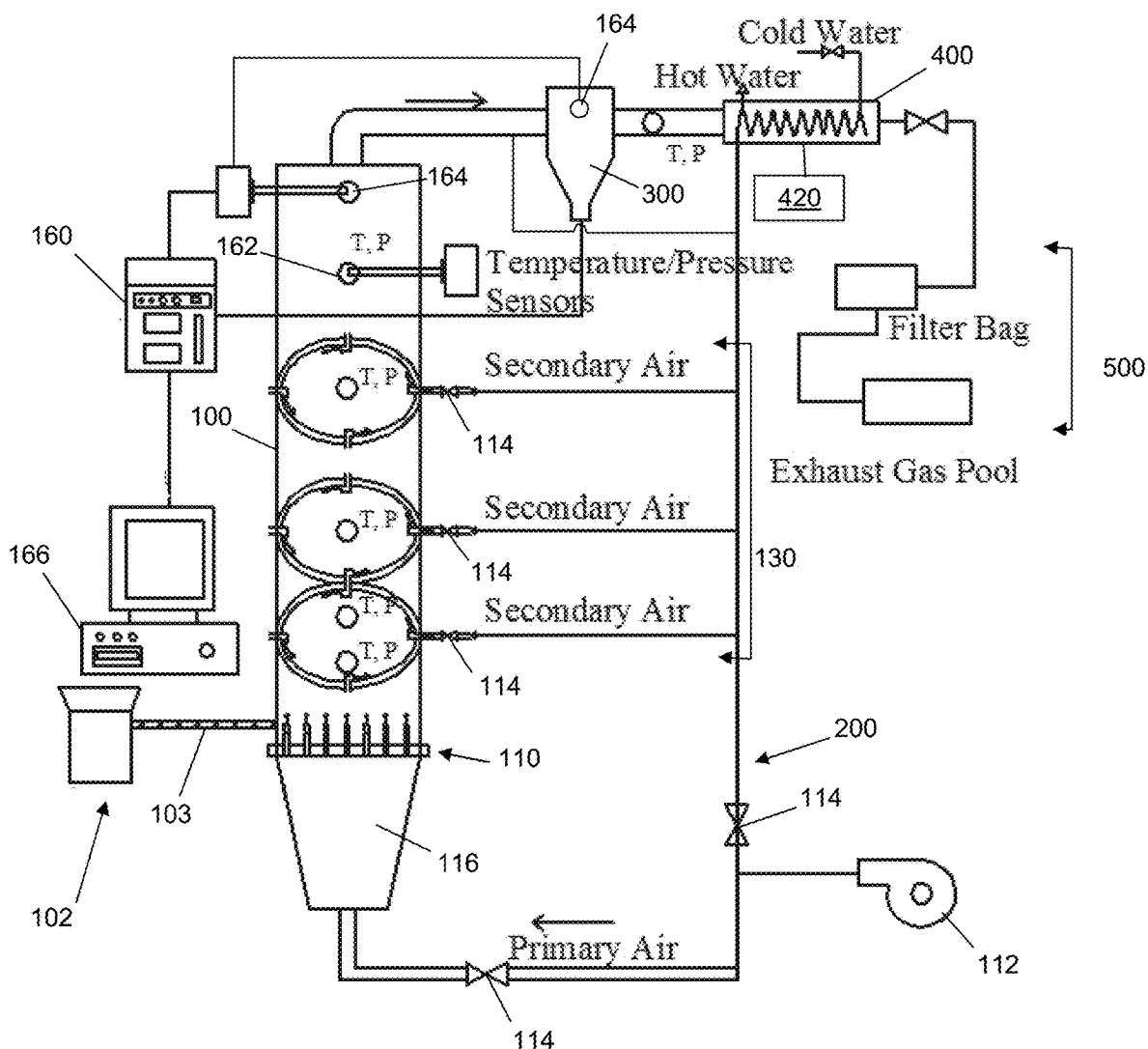
FIG. 1 is a schematic view of a system for burning biomass in accordance with certain aspects of an embodiment of the invention.

FIG. 1 shows a schematic view of a system for burning biomass in accordance with certain aspects of an embodiment of the invention, including a combustion chamber 100, air delivery system (shown generally at 200), a cyclone separator 300, a heat exchanger 400, and exhaust system 500. Optionally, the entire system may be housed on a mobile chassis (not shown) so that the system may be moved from site to site for processing of biomass at the site of production or collection of the biomass.

Combustion chamber 100 includes a generally cylindrical housing having preferably a metal exterior and a refractory layer on an interior surface of the metal exterior. A primary air distribution and delivery system 110 is provided in the bottom of the combustion chamber 100 and receives high pressure air from air delivery system 200, in turn directing that air toward the top of the combustion chamber in order to vertically distribute the biomass/fuel and diffuse particles throughout the column in the combustion chamber 100. Moreover, secondary air distribution and delivery system 130 includes multiple, vertically displaced rows of nozzles, discussed in greater detail below, which nozzles are configured to provide controllable, multi-angle air-injection at multiple, distinct vertical levels within combustion chamber 100 to provide a swirling flow in the column, which in turn maximizes combustion throughout the combustion chamber 100.

A fuel feeder (shown generally at 102) is provided adjacent combustion chamber 100, and may be provided, by way of non-limiting example, a hopper for receiving biomass, poultry litter, and other materials that might be used for fuel in the combustion chamber 100, and a delivery mechanism 103, such as a feed screw, configured to deliver such biomass/fuel from fuel feeder 102 to combustion chamber 100. Such biomass/fuel is delivered into combustion chamber 100 at a point above primary air distribution and delivery system 110, and below secondary air distribution and delivery system 130. The solid biomass/fuel is supplied tangentially into the combustion chamber 100, such that no bed material is required. The airflow from the primary air distribution and delivery system 110 and from the secondary air distribution and delivery system 130 act as both particle fluidizers and combustion oxidizers. The multiple levels of nozzles of secondary air distribution and delivery system 130 provide extended swirl flow along with additional air (e.g., oxygen supply). This configuration retains particles in the combustion zone, reducing unburned particles and thus minimizing residual material. The extended swirling flow generated by the system results in vigorous particle-to-wall collisions, which increases the residence time and combustion efficiency of fuel particles in the combustion zone.

A natural gas feed 104 is preferably positioned to feed natural gas into combustion chamber 100 above primary air distribution and delivery system 110. Natural gas is preferably used only to initiate the burn at startup in order to achieve the initial biomass ignition. Further, monitoring and control subsystem 160 is provided, which preferably includes temperature and pressure sensors 162 within combustion chamber 100, one or more particulate matter (PM) meters and emissions probes 164 capable of monitoring both levels of particulates and gaseous emissions (including NOx, SOx, CO, and $CO_2$), which sensors and probes are readily commercially available such that their specific configuration is not addressed further here. Likewise, those skilled in the art will recognize that additional process control accessories may be provided as may be suitable for a particular installation. Monitoring control subsystem 160 is also in electrical communication with, and thus is configured to provide control signals to, delivery mechanism 103 from fuel feeder 102 (e.g., by controlling a motor driving a feed screw of delivery mechanism 103) to control the amount of biomass/fuel delivered to combustion chamber 100, to a blower 112 to control the amount of air delivered through primary air distribution and delivery system 110 and through secondary air distribution and delivery system 130, and preferably to valves 114 to allow independent control of the amount of air delivered through such systems 110 and 130 with respect to one another. Alarm levels may be established for monitored data, which alarm levels are preferably set by a person using data processing equipment 166 responsible for configuring the system. As an alarm relay is activated, the monitoring and control subsystem 160 is configured to decrease the fuel feeding rate through preferably a variable speed controller, reducing such feed rate to a point necessary to have the particulate matter levels below the set alarm relay levels. Likewise, monitoring and control subsystem 160 controls the amount of air delivered through primary air distribution and delivery system 110 and through secondary air distribution and delivery system 130 (through control of blower 112 and valves 114 in air delivery system 200) so as to control the burn rate in combustion chamber 100. All of these factors may be controlled so as to maintain the safest possible burn rate so as to maintain emissions within a desired range and so as to ensure a maximum efficiency in biomass combustion is maintained.

With continued reference to FIG. 1, exhaust from combustion chamber 100 is directed to a cyclone separator 300. As will be discussed in further detail below, any waste and particles that remain unburned in combustion chamber 100 are directed to the cyclone separator 300, where such unburned waste and particles are burned, and flying ash is divided and collected in a container connected to the cyclone separator, while dioxin production is significantly minimized if not altogether eliminated. The collected ash and char may optionally be used as fertilizer. The system exhaust, in the form of high temperature flue gas, is directed from cyclone separator 300 to a heat exchanger 400 and an exhaust system 500 including a pollutant control unit. Heat captured by heat exchanger 400 may be put to useful work through use of any thermal energy conversion device 420 as may be deemed appropriate for a given installation by persons of ordinary skill in the art, such as by way of non-limiting example by generating steam for delivery to a turbine, powering a Stirling engine, or such other energy generation devices as may be apparent to those skilled in the art, or for direct heating of process materials, such as water, feed stock (for drying the same), or the like, or such other direct heat application processes as may be apparent to those skilled in the art.

Figure 2:
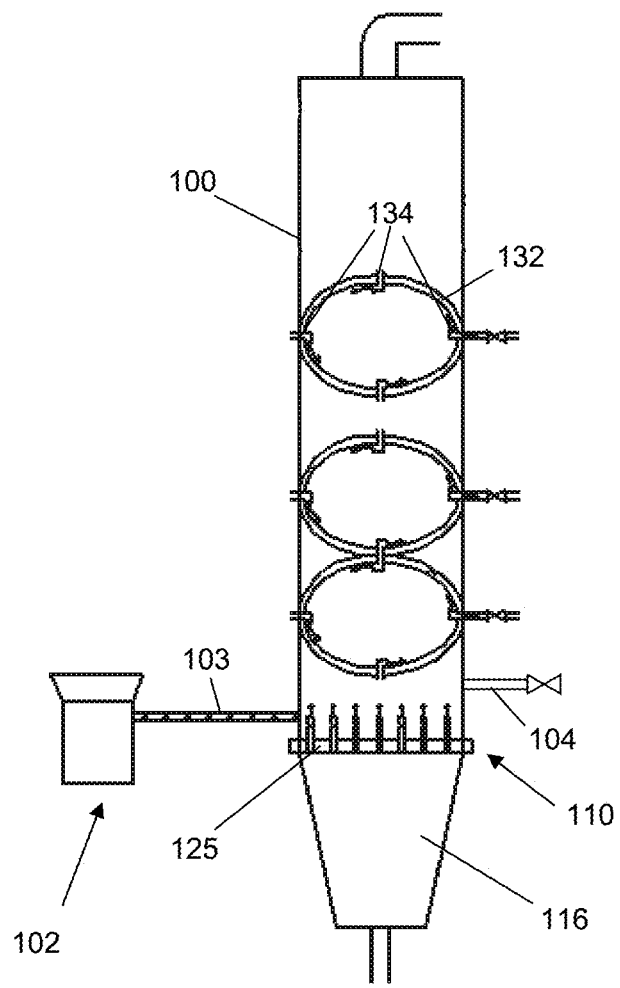
FIG. 2 is a close-up, cross-sectional view of a combustion chamber used in the system of FIG. 1.
Figure 3:
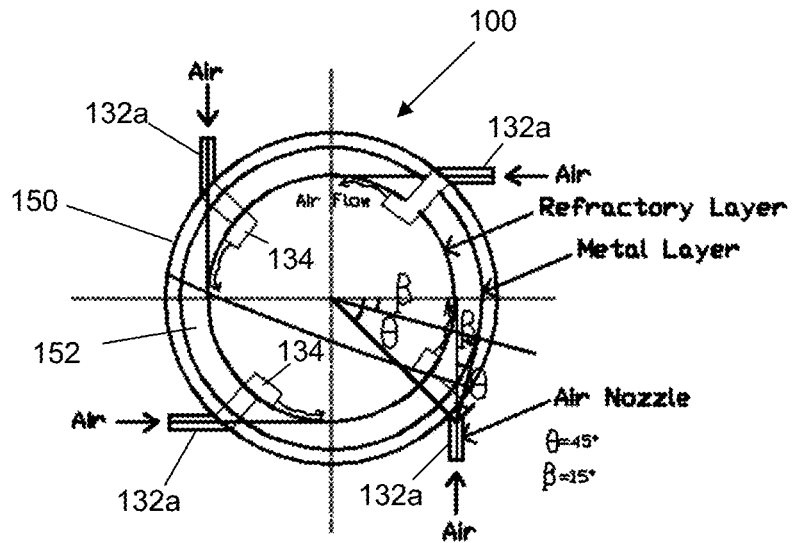
FIG. 3 is a top, cross-sectional view of the combustion chamber of FIG. 2.

FIG. 2 provides a front, cross-sectional view of combustion chamber 100, while FIG. 3 provides a top, cross-sectional view of combustion chamber 100. As shown in FIGS. 1-3, combustion chamber 100 includes a primary air box 116 that receives primary air from blower 112 and directs such primary air to primary air distribution and delivery system 110. Primary air distribution and delivery system 110 directs primary air into combustion chamber 100, where such primary air receives natural gas through natural gas feed 104 and biomass/fuel from delivery mechanism 103, both igniting the biomass as it enters combustion chamber 100 and causing it to flow upward in combustion chamber 100. As such biomass flows upward through combustion chamber 100, it encounters secondary air distribution and delivery system 130, which in turn comprises two or more airflow manifolds 132, each of which receives air from air delivery system 200. Each airflow manifold 132 directs secondary air to a plurality of secondary air injection nozzles 134 positioned around an interior circumference of combustion chamber 100. In a particularly preferred embodiment, four air injection nozzles 134 are provided at a common height on the interior of combustion chamber 100 and are spaced evenly along the interior circumference of combustion chamber 100 at that common height. The secondary air injection nozzles 134 control the direction of the injected secondary air into combustion chamber 100, injecting such secondary air at various angles so as to cause the particles and air in combustion chamber 100 to achieve a swirling effect so as to increase combustion of the biomass in combustion chamber 100.

As best shown in the top, cross-sectional view of FIG. 3, air nozzles 132*a* may be provided along an exterior of combustion chamber 100 that receive secondary air from airflow manifolds 132 and deliver such secondary air to each secondary air injection nozzle 134. Each secondary air injection nozzle 134 has a first branch that extends radially through both an exterior metal layer 150 of combustion chamber 100 and an internal refractory layer 152 lining an interior of combustion chamber 100. An interior branch of each air injection nozzle 134 is arranged at approximately 90° to each respective first branch so as to position the outlet of secondary air injection nozzle 134 to direct secondary air tangentially along the interior of refractory layer 152 of combustion chamber 100, in turn creating a swirling effect on the interior of combustion chamber 100.

Figure 4:
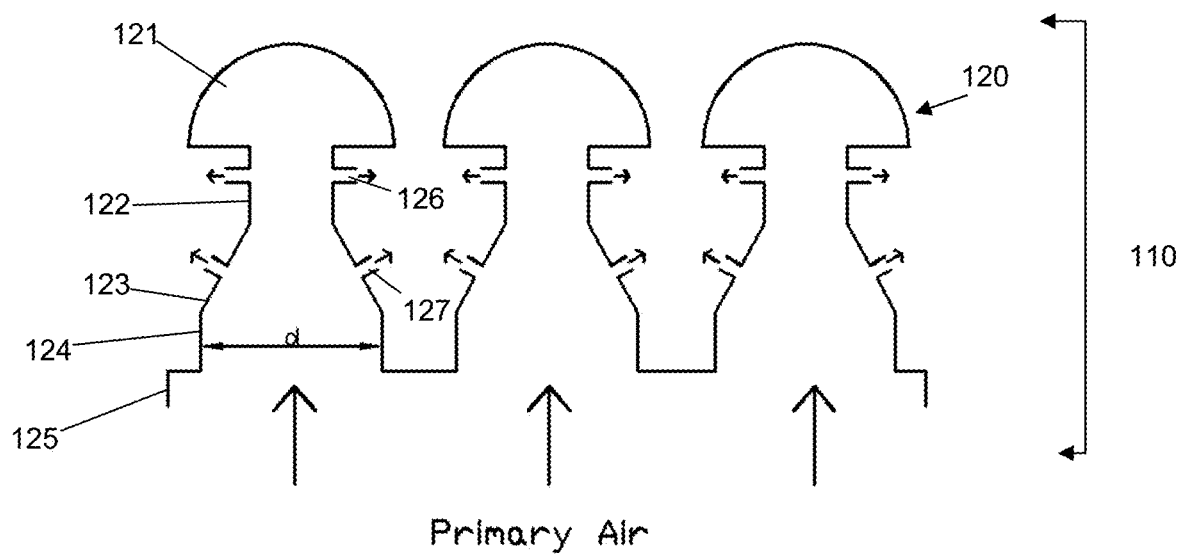
FIG. 4 is a side view of primary airflow nozzles for use in the combustion chamber of FIG. 2.

As shown in the side view of primary air distribution and delivery system 110 of FIG. 4, the primary air distribution and delivery system 110 includes a plurality of primary nozzles 120, which nozzles 120 are particularly configured to maximize air distribution at the bottom of combustion chamber 100. Each nozzle 120 has a rounded, semi-circular head 121, a cylindrical branch 122 extending downward from head 121, and an outwardly extending lower branch 123 that has a widening diameter as it extends from cylindrical branch 122 to base portion 124, which base portion 124 comprises the widest diameter d for each nozzle 120. Base portion 124 receives air directly from primary air distribution and delivery manifold 125, which extends horizontally along the bottom portion of combustion chamber 100, receiving air from primary air box 116. In certain configurations, a plurality of manifolds 125 may extend horizontally across the bottom of combustion chamber 100 so as to provide even distribution of nozzles 120 across the full width of combustion chamber 100.

With continued reference to FIG. 4, horizontally extended outlets 126 are positioned on each cylindrical branch 122, and upwardly angled outlets 127 are positioned on each lower branch 123, for feeding air from primary air distribution and delivery system 100 into combustion chamber 100. In a particularly preferred embodiment, each primary nozzle 120 includes four horizontally extended outlets 126 and four upwardly angled outlets 127. In a prototype construction implementing the system and methods described herein (described in greater detail below), a total of 24 outlets 126 were provided, each having a diameter d of ⅛ inch. In an embodiment of the invention, openings formed by horizontally extended outlets 126 and upwardly angled outlets 127 comprise 2% of the overall surface area of the primary air distributor.

Figure 5:
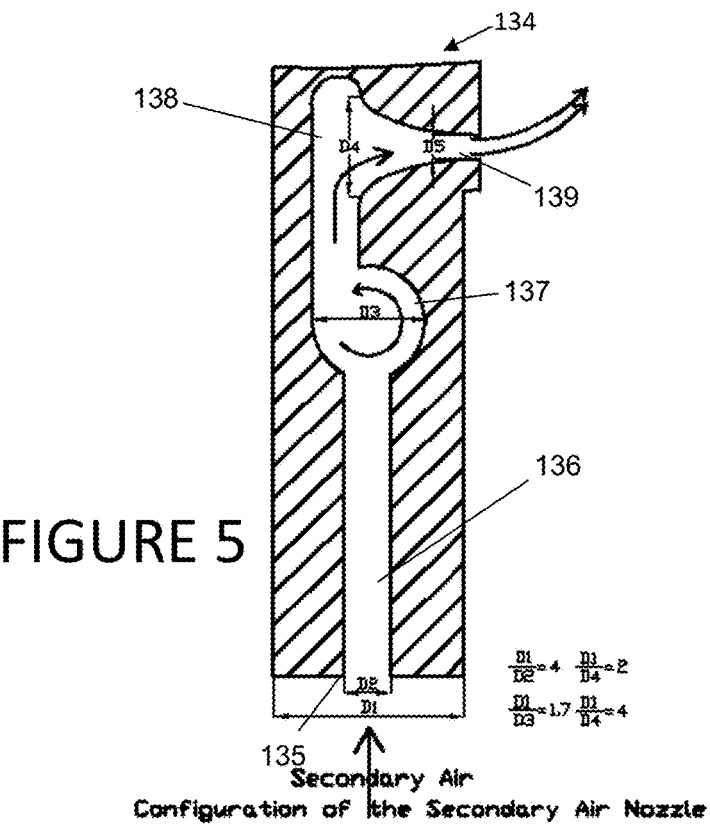
FIG. 5 is a cross-sectional view of a secondary airflow nozzle for use in the combustion chamber of FIG. 2.

Similarly, and with reference to the cross-sectional view of secondary air injection nozzles 134 of FIG. 5, both the shape and axial position of secondary air nozzles 134 are important to providing proper air and material flow within combustion chamber 100. More particularly, secondary air injection nozzles 134 function to change the direction of the supplied secondary air so as to cause a swirling flow condition inside of combustion chamber 100. As mentioned above, sets of preferably four, evenly circumferentially spaced secondary air injection nozzles 134 are provided at at least two, and preferably three, distinct heights on the interior of combustion chamber 100. In the prototype construction described above, the bottom-most set of secondary air injection nozzles 134 were positioned 34 inches from the bottom of the combustion chamber and primary air distribution manifold 125, with the subsequent higher sets of secondary air injection nozzles 134 each evenly spaced 10-11 inches above the next-lowest set. In any configuration, the position and number of secondary air injection nozzles will generally be determined by the height of the combustion chamber 100 above air box 116, with horizontally aligned sets of secondary air injection nozzles 134 being positioned equidistant to one another. It has been found that at least three horizontal sets of secondary air injection nozzles 134 are most preferred in order to ensure that an optimal biomass material residence time is maintained for the biomass particles undergoing combustion. The higher the number of second air injection nozzles 134, the higher the oxygen supply into the combustion chamber 100, which in turn increases the swirling effect on the fluidized bed and a resulting high combustion efficiency above 90%.

Each secondary air injection nozzle 134 includes inlet 135 that receives secondary air from an airflow manifold 132. Inlet 135 opens into inlet channel 136, which in turn directs secondary air into a centrally located, circular chamber 137. An interior flow channel 138 extends from chamber 137, and at a distal end directs the airflow through nozzle outlet 139, which outlet 139 extends at generally 90° to a flow axis of both inlet channel 136 and interior flow channel 138, in turn introducing air into combustion chamber 100 in a tangential direction so as to cause swirling air flow. This configuration has been found to provide a swirling air flow from the secondary air injection into combustion chamber 100, which in turn forms the particle suspension layer and dilution zone within combustion chamber 100. Through adjustment of the secondary air injection through secondary air injection nozzles 134 configured in this manner, the axial position of the particle suspension layer within combustion chamber 100 can be closely controlled.

The resulting strong swirling air flow field in combustion chamber 100, in combination with the interaction of centrifugal forces and gravity on the particles in combustion chamber 100, cause larger particles to be kept in combustion chamber 100 for a significant amount of time, in turn contributing to high combustion efficiency and extremely low emissions. The swirling particle flow in combustion chamber 100 can be described by stochastic trajectory modeling (STM), and the diffusion-kinetics model can be used for predicting fuel materials depletion during the combustion process to describe the residence time of particles in combustion chamber 100, which modelling techniques are known to those of ordinary skill in the art. These techniques may, in turn, be used to control biomass feed rate and airflow through primary air distribution and delivery system 110 and secondary air distribution and delivery system 130 to effect residence time and the overall combustion process in combustion chamber 100. By way of non-limiting example, in the exemplary prototype construction described below, biomass material residence time in combustion chamber 100 would preferably be in the range of 2-5 seconds with combustion temperatures of 1400-1700° F.

Figure 6:
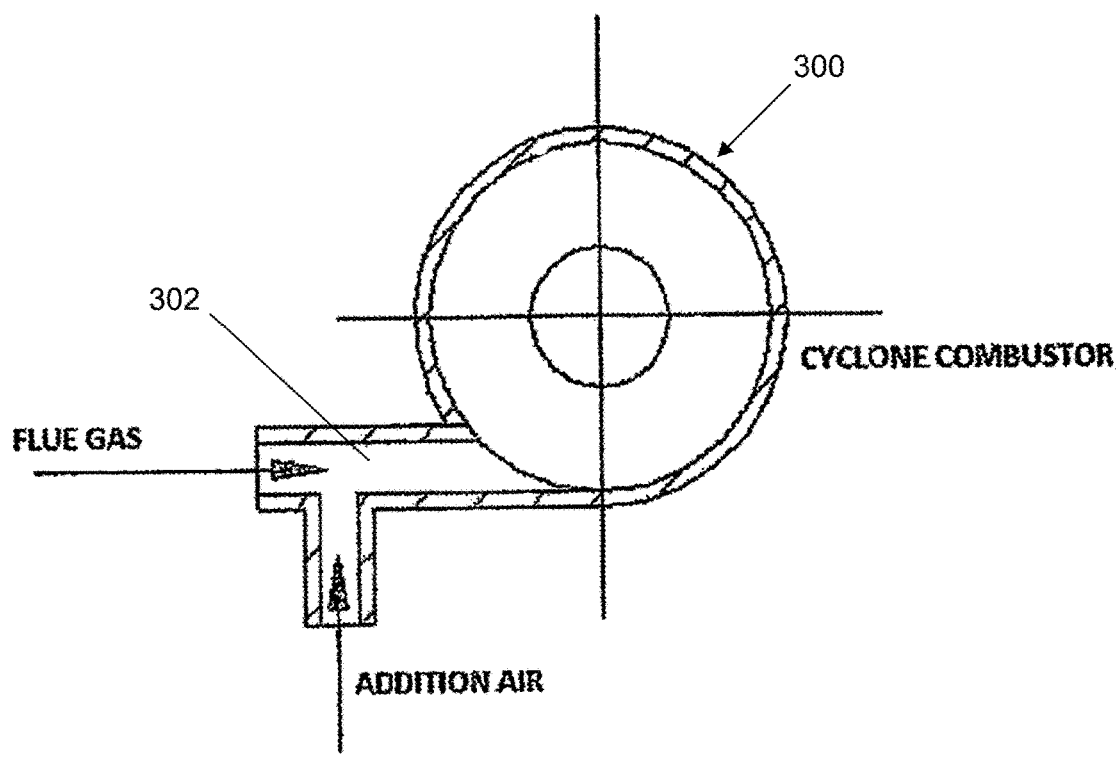
FIG. 6 is a top, cross-sectional view of a cyclone separator used in the system of FIG. 1.

FIG. 6 is a top, cross-sectional view of the cyclone combustor 300, having an air inlet 302 that receives flue gas from combustion chamber 100 and fresh air from air delivery system 200. The high temperature flue gas directed to cyclone combustor 300 may contain unburned carbon particles. As shown in FIG. 6, fresh air is added into the flue gas before it enters the cyclone combustor 300. In this configuration, the unburned carbon particles and oxygen in the fresh air will burn again in the cyclone combustor 300. In addition to re-burning the unburned carbon, the cyclone combustor 300 functions as a particle separator in which the coarse particles will fall down to a particle collector. The flue gas is therefore preliminarily cleaned through the cyclone, before it is passed on to heat exchanger 400 and exhaust system 500. After heat exchanger 400, the flue gas may thus be directed to exhaust system 500, which may include (by way of non-limiting example) a filter bag or other filter housing, and an exhaust stack or exhaust gas pool of standard configuration.

As mentioned above, heat exchanger 400 may be employed to capture heat from the flue gas from combustion chamber 100 to generate useful energy. Residual heat from combustion chamber 100 may be used for producing electricity, direct heating of water, for drying of materials (including drying of biomass material that is to be processed through combustion chamber 100 before its introduction into combustion chamber 100), or for heating of spaces for workers, consumers, livestock, or the like.

Figure 8:
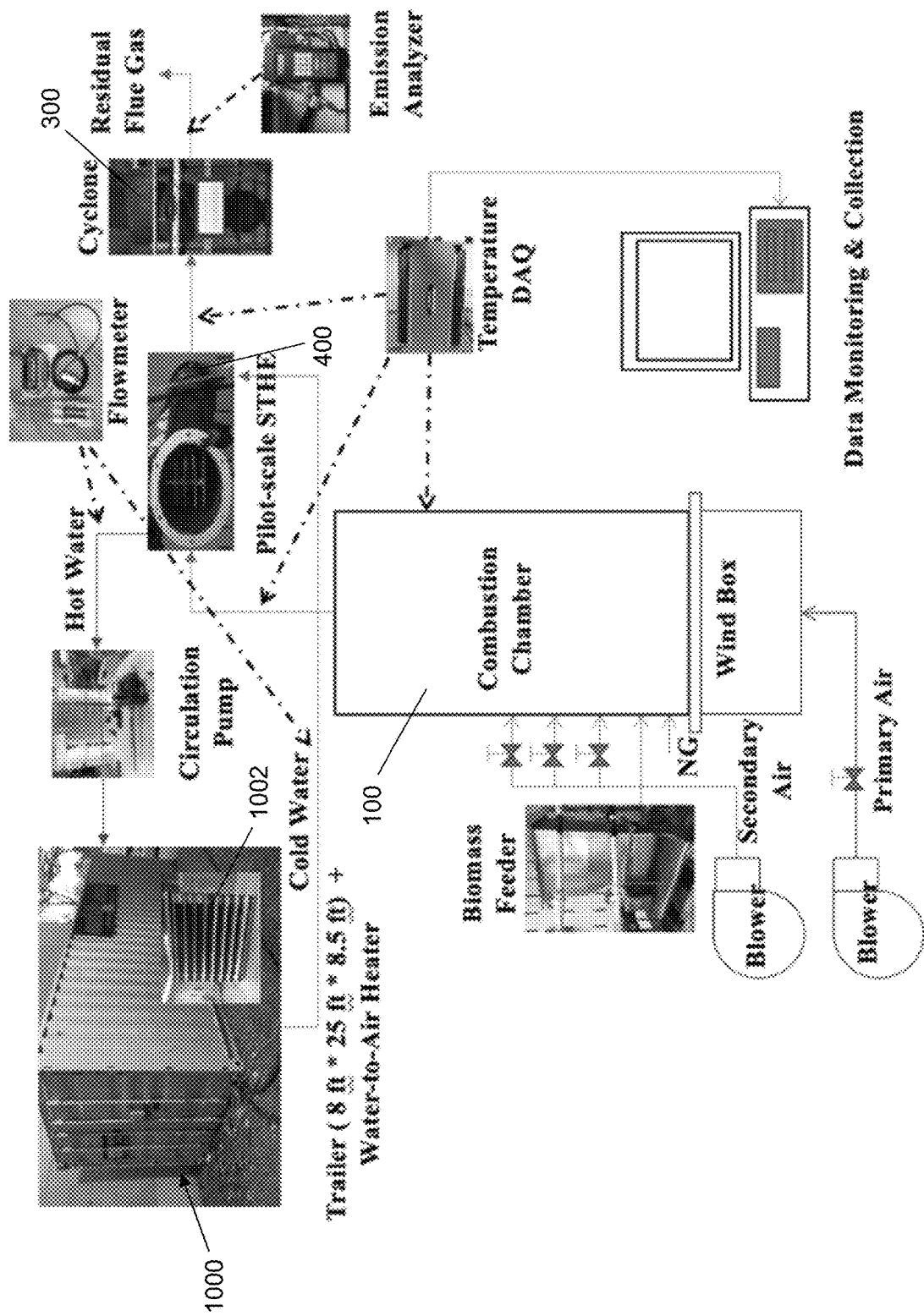
FIG. 8 is a schematic view of the system of FIG. 1 and including a twisted tube-based shell tube and heat exchanger (STHE) system.

For example, in certain configurations, and as shown in the schematic view of FIG. 8, heat exchanger 400 may comprise a shell tube and heat exchanger (STHE) system positioned between combustion chamber 100 and cyclone separator 300 to allow for heating of a fluid, such as water, and transporting that fluid to a trailer 1000, space or equipment that is to be heated, such as a closed room, such as a housing unit, and particularly a housing unit configured for housing chickens that produce animal waste (i.e., poultry litter) that is burned in combustion chamber 100. By way of summary and as discussed in greater detail below, the STHE 400 in such a system may comprise a plurality of twisted tubes (e.g., copper tubes), baffles, flanges, and a cylindrical shell in which heat generated from the combustion of biomass in combustion chamber 100 heats fluid in the tubes, which heated fluid (e.g., water) is transported to another location, such as a house or trailer 1000 as may be used for holding chickens, in order to provide that space heating with radiated heat.

In the configuration of FIG. 8, combustion chamber 100 burns material, such as biomass (which as above may comprise poultry litter), and in that process generates hot flue gas as the biomass is combusted into ash. As part of the combustion process, the hot flue gas and ash also travels through series of tubes (to, as described above, be processed by cyclone separator 300 and further through the system), which heats up the surface of the tubes to hundreds of degrees. From those heated tubes, a portion of radiated heat may be used for a variety of purposes, including space heating and drying processes.

As shown in FIGS. 9(a) through 12 (all dimensions being exemplary only), an efficient and cost-effective, compact twisted tube-based STHE system 400 includes a plurality of twisted tubes 402 and segmented baffles 404, and a cylindrical shell 406 holding the foregoing assembly, which cylindrical shell 406 may in certain configurations be composed of carbon steel pipe. In certain test configurations of STHE 400, six twisted tubes 402 and five segmented baffles 404 have been employed. In other configurations 16 twisted tubes 402 have been employed, although more or fewer twisted tubes 402 and segmented baffles 404 may be used for particular installations without departing from the spirit and scope of the invention. In each case, twisted tubes 402 may be interconnected at their ends using appropriate joints, such as 90° elbows, T-joints and 4-way cast copper crosses.

In exemplary configurations, a single twisted tube 402 may have at least four sets of twists, and multiple tubes extend in parallel with one another, each having one input end and one output end.

Segmented baffles 404 support the bundle of twisted tubes 402 inside cylindrical shell 406 and maintain the desired velocity of hot flue gas through STHE 400. As best viewed in FIG. 9(a), baffles 404 are preferably alternatively positioned on upper and lower sets of twisted tubes 402. Such arrangement of baffles 404 creates turbulence and resists vibrations, in turn enhancing the fluid flow to increase the heat transfer coefficient of STHE 400. More particularly, the segmented baffle forces the flue gas inside of shell 406 to travel through in a zigzag manner, thus improving heat transfer with acceptable pressure drops. Further, the baffle inclination angle may play an important role in controlling flow velocity and influence the transfer coefficient. A 90° inclination angle may cause a dead zone to form behind baffles and may lead to an increase of fouling resistance, which ultimately decreases the heat transfer rate. Thus, baffles 404 as used herein are preferably positioned with respect to twisted tubes 402 so that they have 20°-50° inclination angle, and more preferably a 40° inclination angle.

Figure 9B:
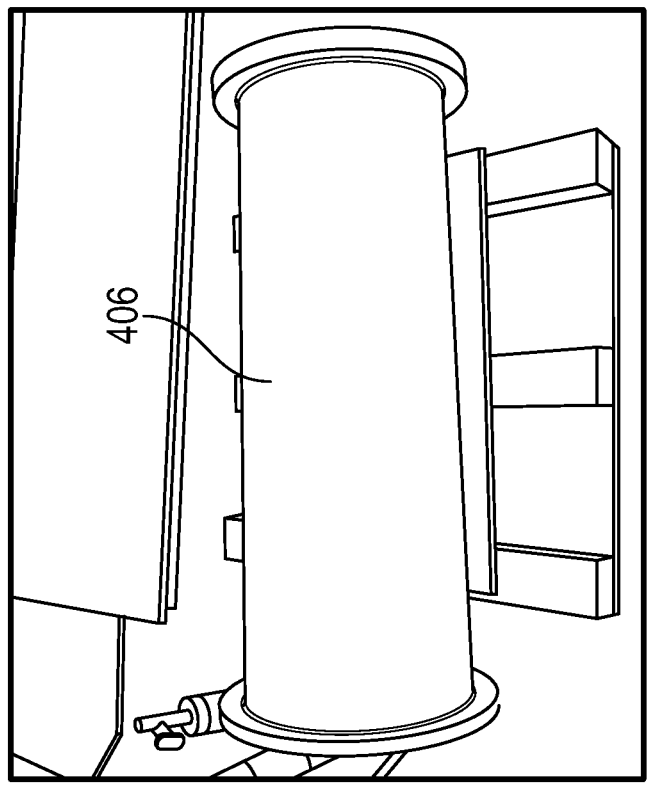
FIG. 9(b) is a close-up view of a cylindrical shell for use in the shell tube and heat exchanger system of FIG. 8.
Figure 9A:
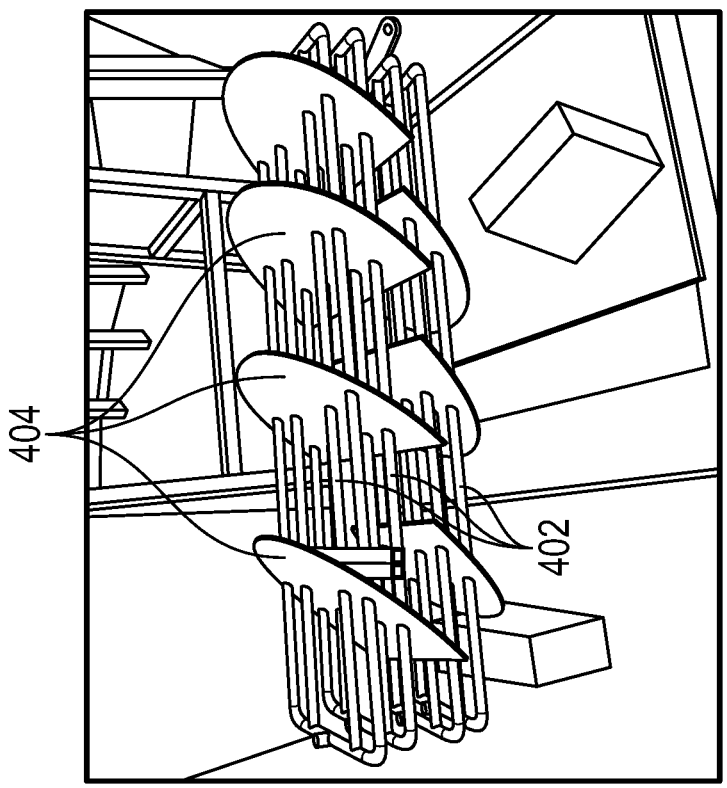
FIG. 9(a) is a close-up view of an internal twisted tube assembly for use in the shell tube and heat exchanger system of FIG. 8.
Figure 10:
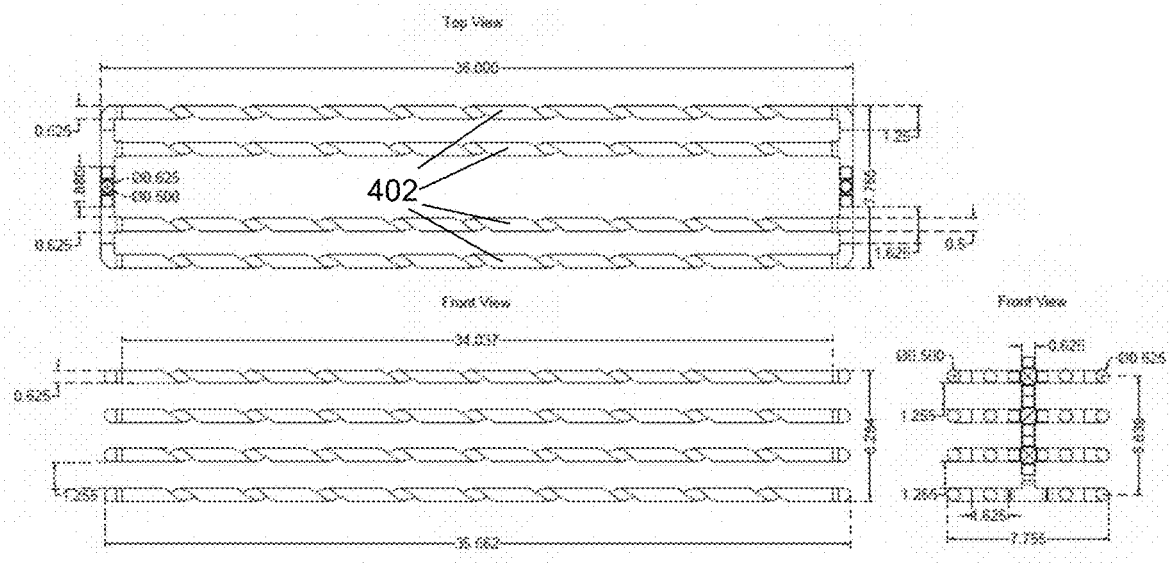
FIG. 10 provides top, front, and end views of the internal twisted tube assembly of FIG. 9(a).
Figure 11A:
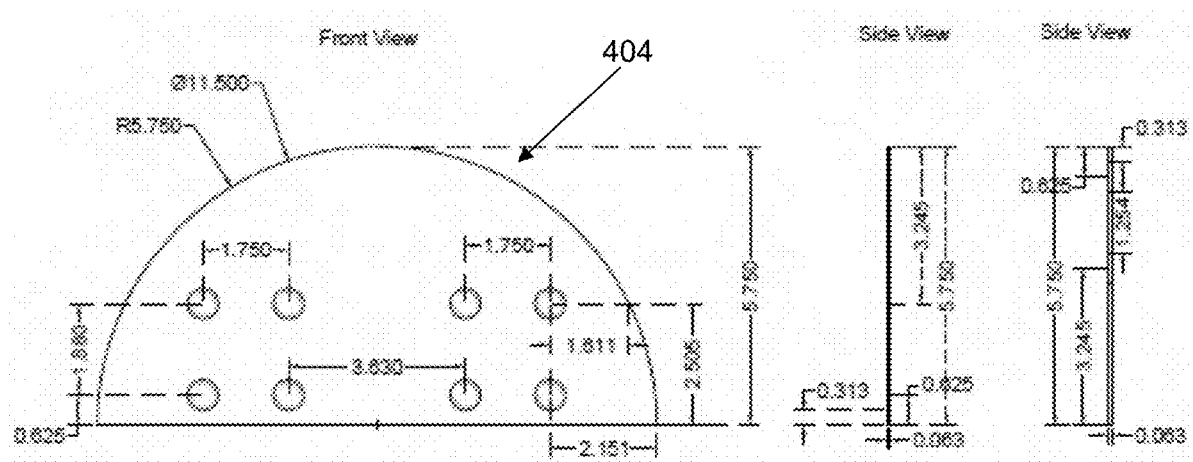
FIG. 11(a) provides front and side views of a baffle for use with the internal twisted tube assembly of FIG. 9(a).
Figure 11B:
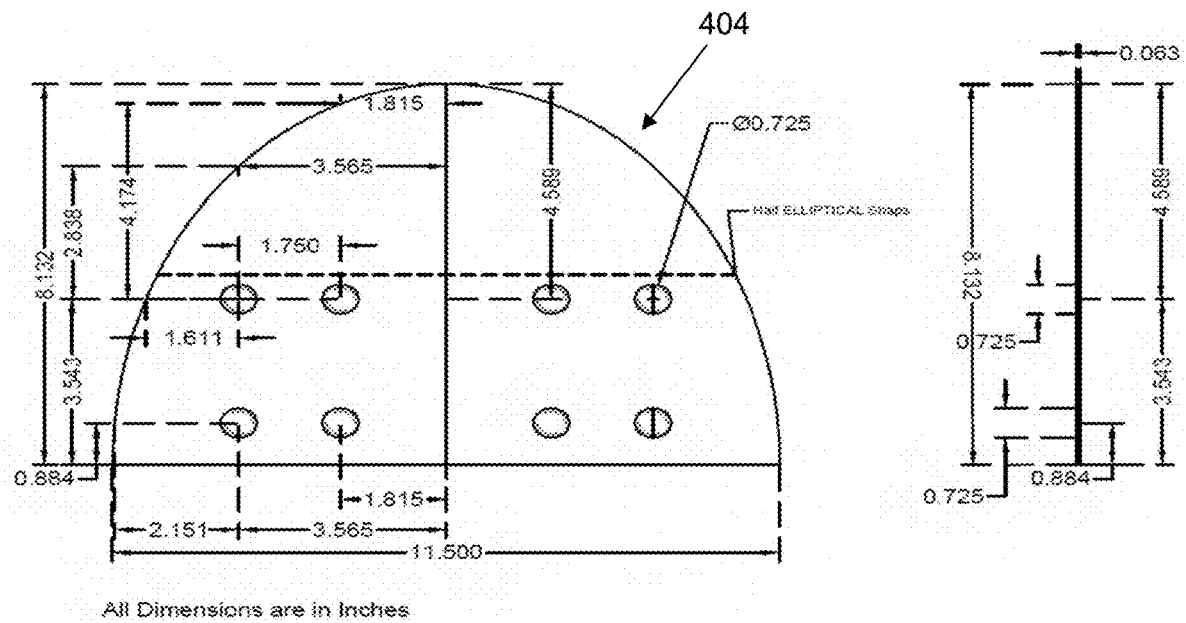
FIG. 11(b) provides front and side views of another baffle for use with the internal twisted tube assembly of FIG. 9(a).
Figure 12:
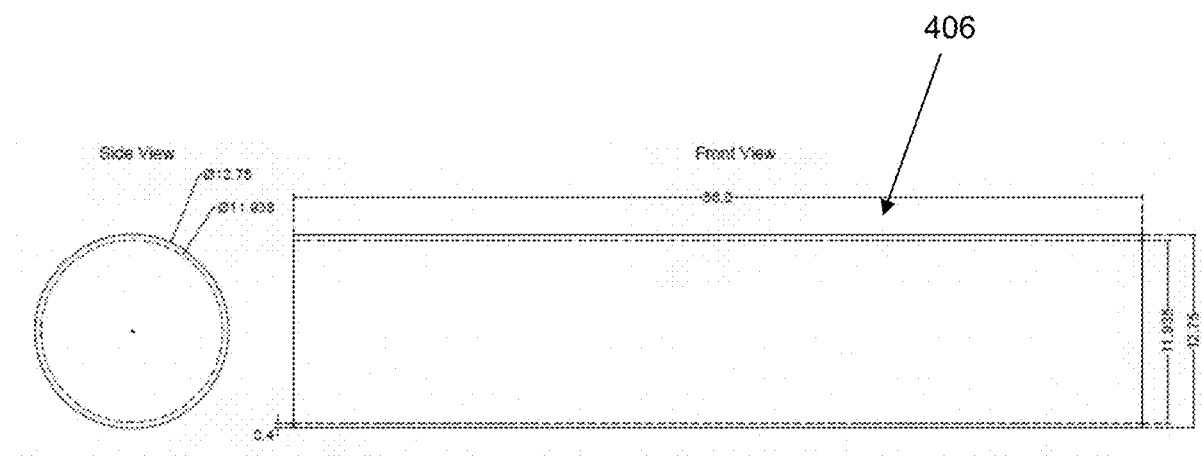
FIG. 12 Provide cross-sectional side and end views of the cylindrical shell of FIG. 9(b).

In an exemplary configuration, cylindrical shell 406 (FIG. 9(b)) may include flanges 408 at opposite ends and configured for sealed connection to the rest of the combustion system between 90-degree elbow section 101 and cyclone separator 300.

During the combustion process, biomass such as poultry litter is fed into combustion chamber 100 by feeder 102. In addition, the primary and secondary blowers supply combustion air into combustion chamber 100 as detailed above. After the combustion process generates a hot flue gas, it is directed into shell 406 and passes through the series of segmented baffles 404 to heat the water in twisted tubes 402. The processed hot water from the STHE 400 may then be supplied into radiators 1002 to heat space 1000, and thereafter returned as cold water into the STHE 400. In a particularly preferred configuration, space 1000 is provided two radiators 1002 arranged in parallel flow, which was found to have significantly higher heating capability than two radiators 1002 arranged in serial flow.

Swirl flow in twisted tubes 400 increases residence time and produces inertial mass forces, which generates a secondary flow and enhances the tube side mixing of fluid to increase convective heat transfer coefficients inside of tubes 402. In the meantime, a steady velocity profile of flow in the shell 406 is also interrupted by constant direction change on the twisted tube surface, which maintains turbulent flow and achieves good transverse mixing to increase the heat transfer rate.

As shown in FIG. 8, in order to measure results in an exemplary prototype configuration, a data acquisition system, water flow-rate sensors, and thermocouples were carefully installed to monitor and record inlet/outlet water flow rate and hot/cold flue temperature changes. Results indicated that countercurrent flow with an optimized location of three pumps in the space heating module provided hot water (around 149° F.-150° F., from 68° F.-69° F.) and can provide space heating for poultry houses (from 57° F.-63° F. to 90° F.-95° F.) within 180 minutes of the start of the heating process (outside temperature 57° F.-64° F.). Hot water circulation pumps were particularly placed with two positioned between the space 1000 and STHE 400 in series and pumping water to STHE 400, with a source of fresh water being supplied between the two pumps, and a third pump positioned between STHE 400 and space 1000 and pumping newly heated water to space 1000, allowing a maximum control of water flow rate through STHE 400 and the resultant heat transfer between the hot flue gas in shell 406 and the water inside of twisted tubes 402. Alternatively, in certain configurations, a single large capacity water circulation pump may be employed to assist in increasing water flow rate and velocity through tubes 402, such as between the STHE 400 and space 1000 that is to be heated.

The foregoing showed that the configuration of twisted tubes 402 provided better performance than a straight tube based STHE system. Analysis and calculations found that the prototype twisted tube based STHE system had a conversion efficiency between 34.3% and 41.1% in transferring heat energy from the hot flue gas resulting from the poultry litter combustion process into the cold water inside of twisted tubes 402. Notably, however, use of a system as described herein comprising 16 twisted tubes 402 with baffles 404 situated at a 40° inclination angle yielded a 47.7%-60.1% efficiency in transferring heat energy from the hot flue gas resulting from the poultry litter combustion process into the water inside of twisted tubes 402.

Total heat energy from the biomass combustion process entering the pilot-scale heat exchanger 400 ($Q_{in}$) is equal to the energy that leaves the heat exchanger 400 through radiation from the pipe to the room air ($Q_{air}$), the energy transferred to the water ($Q_{water}$), and the energy that exits the exchanger as flue gas ($Q_{exhaust}$). This can be expressed as: $Q_{in}=Q_{air}+Q_{water}+Q_{exhaust}$ The energy content of hot flue gas ($Q_{in}$) and exhaust flue gas ($Q_{out}$) were calculated by following equation:

$$Q\dot{m}*C_p*dT$$

where $\dot{m}$ is the total mass flow rate of fuels (i.e., poultry litter), air and natural gas, $C_p$ is the specific heat of the hot flue gas (assumed to be close to 0.24 Btu/lb.° F.), and dT refers to the temperature changes of flue gas before entering and exiting the heat exchanger 400. Energy transferred to the water ($Q_{water}$) was calculated by using water flow rates, water density, specific heat of water and water temperature changes between water inlet and water outlet. Then, the efficiency was calculated by dividing the $Q_{water}$ to $Q_{in}$. As shown in Table 1, approximately 34.3% to 41.1% of the energy entering the heat exchanger 400 was transferred to the water.

TABLE 1

Summary of the Operating Factors and Performance Parameters of the Prototype STHE System

| PL % | NG 1 & 2 SCFH | PA % | SA % | Gas In F | Gas Out F | Water in F | Flow Rate GPM | Water Out F | $Q_{in}$ BTU | $Q_{water}$ BTU | Eff. % |
|---|---|---|---|---|---|---|---|---|---|---|---|
| 45 | 20 | 20 | 20 | 5 | 1055.66 | 580.82 | 75 | 0.8 | 106 | 31,799 | 13,070 | 41.1 |
| 55 | 20 | 20 | 25 | 5 | 1191.2 | 662.36 | 82 | 0.86 | 122 | 38,230 | 15,411 | 40.3 |
| 55 | 20 | 20 | 25 | 5 | 1168.34 | 718.7 | 94 | 0.84 | 133 | 45,385 | 15,883 | 35.0 |
| 55 | 20 | 20 | 25 | 5 | 1212.98 | 731.3 | 100 | 0.84 | 142 | 46,415 | 16,800 | 36.2 |
| 60 | 0 | 20 | 30 | 5 | 1171.76 | 778.42 | 105 | 0.82 | 146 | 48,991 | 16,808 | 34.3 |
| 60 | 0 | 70 | 30 | 5 | 1201.87 | 730.76 | 110 | 0.92 | 146 | 47,296 | 17,197 | 36.4 |

The exemplary prototype configuration discussed above also exhibited improved heat transfer efficiency where the fluid in twisted tubes 402 ran in a direction countercurrent to flue gas in shell 406. With such countercurrent configuration, the prototype system processed hot water (heating close to 146° F., up from the inlet temperature of 87° F.) at a flow rate of 0.46-0.64 gallons per minute (GPM) while the hot gas inlet temperature is 1150° F. and the hot gas outlet temperature is 861° F. (as compared to heating only to 126° F. under a concurrent or parallel flow configuration).

Figure 13A:
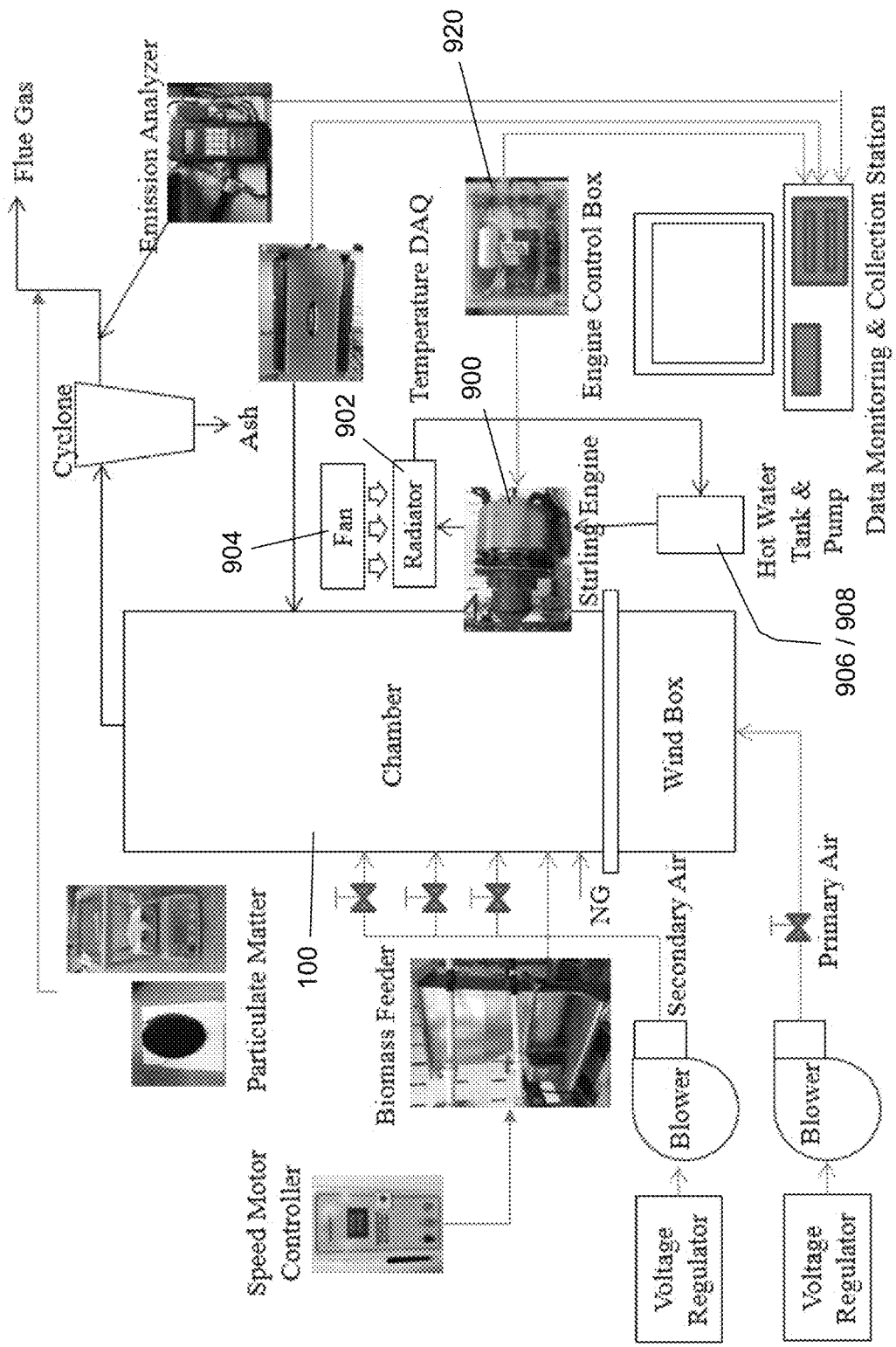
FIG. 13(a) is a schematic view of the system of FIG. 1 and including a Sterling engine.
Figure 13B:
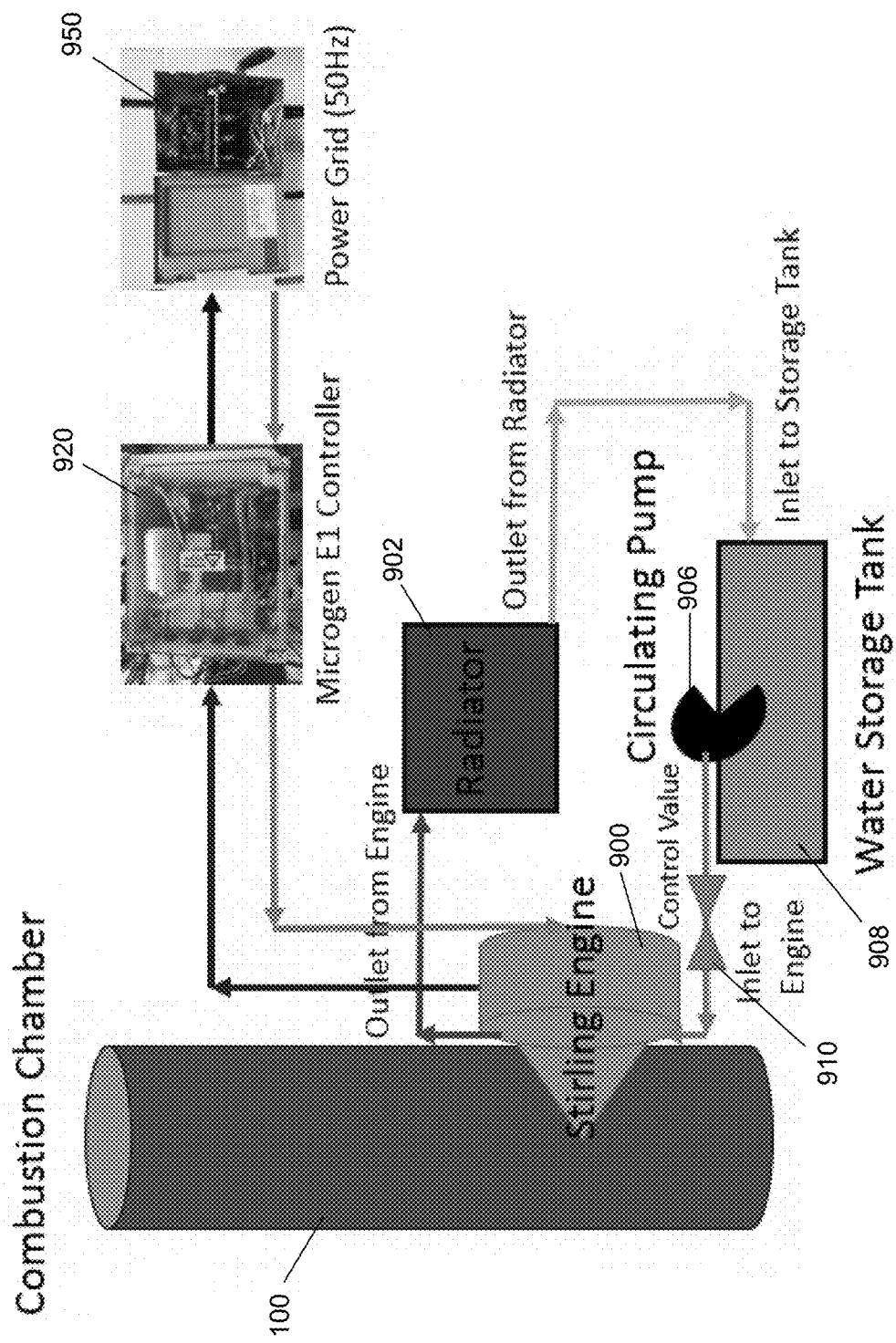
FIG. 13(b) is a schematic view of the system of FIG. 13(b) with certain elements omitted for clarity.

In further configurations, heat generated by combustion chamber 100 may be applied to the generation of electrical and thermal energy, such as through use of a heat engine, such as by way of non-limiting example a Stirling engine. FIG. 13(a) is a schematic view of the combustion system including a Stirling engine 900, and FIG. 13(b) shows a more simplified schematic view of such system with certain elements removed for clarity. Such removed elements may likewise optionally include the heat exchanger 400 and space heating system discussed above with respect to FIGS. 8-12.

A Stirling engine, also known as a heat engine, is an external heat engine that converts heat energy into mechanical work via a closed regenerative thermodynamic cycle that has same theoretical thermal efficiency as the Carnot cycle. The engine experiences periodical compression and expansion of working fluid at different temperature levels to convert thermal energy into mechanical energy. The heat engine consists of a displacement piston that pushes a working fluid (i.e., helium) through the regenerator from the head to the cooler. The spring on the opposite casing at the bottom pushes the piston back upwards. The helium is alternately heated and cooled, and as a result it expands and contracts again to create a pressure wave. This process repeats as the cycle begins again. The working piston is moved up and down by the pressure waves. The working piston is surrounded by a fixed magnetic tape and interacts with copper coils in order to generate alternating current. This cycle may be repeated, for example, 50 times per second to generate AC power at 50 Hz. In an exemplary prototype configuration implementing certain aspects of the invention, the Stirling engine used in testing was manufactured by Microgen Engine Corporation, although other Stirling engines are commercially available and could likewise be used.

In accordance with certain aspects of an embodiment of the invention, and with particular reference to FIGS. 13(a) and 13(b), Stirling engine 900 is combined with combustion chamber 100, preferably at a position that will absorb maximum heat and simultaneously produce both power and hot water during the combustion process. In an exemplary prototype configuration, six (6) K-type thermocouples were installed in the biomass combustion chamber 100 at varied chamber heights to monitor the temperature changes. From previous testing and temperature results, the engine heat head was placed at an optimal height of 406.4 mm above the primary air distributor. The temperature of the engine head inside of combustion chamber 100 was higher (about 2500° F. or 1371° C.) at this position.

The external heat source from the biomass combustion system is absorbed by the engine head surface and is transferred to the helium in the engine head. Then, helium expands and functions as a piston inside of the Stirling engine to generate alternating current as discussed above. The engine head temperature should not exceed 1076° F. (or 580° C.) to protect overheating of the engine. Once the engine head temperature reaches an optimal temperature (e.g., between 977° F. or 525° C. and 1076° F. or 580° C.), external heat and engine head temperature should be maintained to get full power (e.g., 1 kw) from the Stirling engine.

During the processes of electrical generation and hot water generation, the working fluid and engine head are cooled to avoid overheating. To prevent overheating, a cooling system is provided for the Stirling engine. The cooling system consists of a radiator 902, fan 904, circulating pump 906, water storage tank 908, and control value 910 configured to reject heat generated on the working fluid during the power generation process. The radiator 902 (e.g., aluminum core, plastic tank) can be used as a heat exchanger to reject heat from the hot coolant into the surrounding space and return as cold coolant with the help of a 12-volt or 115-volt fan 904. The pump 906 with a water storage tank 908 (e.g., DAYTON 1XLK9 ⅛ HP 115-volt Pump/tank) is preferably used to store and circulate the coolant, comprising a mixture of 50% water & 50% antifreeze coolant, between the engine 900 and the radiator 902. The control valve 910 controls the flow rate of coolant to the engine 900.

A coolant flow sensor from the Stirling engine may be provided between water storage tank 908 and Stirling engine 900 to measure the water inlet flow rate and temperature. The performance of Stirling engine 900 may be measured and monitored with an engine control box 920 along with a Microgen Test Rig Data Viewer. The Microgen Test Rig Data Viewer can also monitor the coolant flow rate. To run the engine in the exemplary prototype configuration without error, the coolant flow was set at a minimum of 7 liters per minute (L/min) while the maximum was set at 25 L/min. The control valve 906 was used to set the coolant flow at 10 L/min. It was observed that higher coolant flow (more than 15 L/min) rejected too much heat from Stirling engine 900 and took a longer time to harvest enough heat from the combustion chamber 100 to generate alternating current (AC) and electricity. The hot coolant from the engine outlet can be connected to the radiator 902 to convert hot coolant flow into cold coolant flow with the help of fan 904. The cooled coolant from the outlet of the radiator 902 can be returned directly to the storage tank 908 and supplied to the Stirling engine 900. This system is a closed loop cooling system to cool the engine from overheating.

The alternating current can be passed through the engine controller system 920. A controller system 920 is used to transfer the alternating current through the regular three-phase grid 950. The engine controller 920 may be used to monitor engine performance and to ensure safe operation of the engine against outside (electrical) damaging events. It also contains the start/stop procedures and provides the connections to other controls, such as the application control and power-related functions. It will automatically shut down the engine if the engine head temperature reaches the maximum temperature of 580° C.

Stirling Engine 900 is connected to and disconnected from the low-voltage electricity distribution network by a grid interface connection 950. The grid interface connection 950 comprises a 50 Hz, 230-volts connection box. The Microgen E1 controller box requires the power to start/stop the engine in ideal conditions and initial power can be taken from the grid to run all of the sensors, data monitoring and log software. In order to start the engine control box, the initial engine head temperature must be less than the grid connection enable temperature (e.g., lower than 338° F. or 170° C.). During the combustion process, alternative power is generated when the engine head temperature reaches 410° F. or 210° C. The alternative power can return to the same grid because the alternative power is also at 50 Hz, 230 volts. A circuit breaker box was built to change 50 Hz, 230 volts into 60 Hz, 110 volts for U.S. usage. The grid disconnection will normally occur when the engine head temperature falls below the grid disconnection temperature (lower than 270° F. or 150° C.) or when there is no power (0 watt) generation at the beginning. As soon as grid disconnection has occurred, the control system moves into an overrun state. In the overrun state, a fan 904 is used to cool the engine head until the engine head temperature falls below the grid connection enable temperature. For emergency grid disconnection, the grid switch can be manually turned off at any time.

A dedicated data monitoring and logging system can be constructed for the Microgen E1 Controller 920. As an example, in the exemplary prototype configuration discussed above, data was continuously transmitted via the RS-485 interface (J9). This data can be readily decoded and used to monitor real-time operation and/or to log test data. Performance data is captured and carried out on a desktop by using the serial port. An RS-485 to RS-232 converter is used to perform the signal conversion and transferred into the Test Rig Data View, which allows one to monitor data that may include the engine head temperatures, coolant flow rate, coolant inlet and outlet temperature, back-end temperature, ambient temperature, voltage, current, power and energy output, etc.

Table 2 below shows the running condition of Stirling engine 900, wherein the head of Stirling engine 900 was placed inside of combustion chamber 100, and a temperature sensor was placed near the engine head to measure the temperature and calculate amount of heat near the engine head. During the biomass (i.e., poultry litter) combustion process, the engine head absorbs the heat and starts running at an engine head temperature of 428° F. or 220° C., while the chamber temperature will be around 1562° F. or 850° C. At the engine running condition, the coolant flow rate will be maintained at 10.0 L/min, and it starts generating power of approximately 180 watts initially. If the engine head temperature ranges from 977° F. (or 525° C.) to 1076° F. (or 580° C.), it is expected to generate full power (about 1 kW) from the engine. However, if the outlet coolant temperature exceeds 131° F. (or 55° C.), the control valve 906 should be changed to increase the water flow rate from 10.0 L/min to 15.0 L/min for maximum power output. Accumulated total (or thermal) energy for the Stirling engine may also be recorded. At an engine head temperature of 1076° F. (or 580° C.) and chamber temperature of 2390° F. (or 1310° C.), 880 watts of electricity and 9.12 kWh of total energy (about 0.88 kWh electricity) was generated at a water flow rate of 10.1 L/min.

During the combustion process, the engine head absorbs heat and starts running at the engine head temperature of 220° C. while the chamber temperature is around 850° C. As the Stirling engine 900 is running, coolant flow rate is maintained at 10.0 L/min, and the Stirling engine 900 starts generating power initially of about 180 watts. If the engine head temperature is maintained around 525° C. to 580° C., full power (e.g., 1 kW) is expected to be produced from the engine. However, if the outlet coolant temperature exceeds 55° C., the control valve should be changed to increase the water flow rate between 10.0 L/min to 15.0 L/min. During the time that the engine head temperature is 580° C. and the chamber temperature is 1310° C., 880 watts of power may be produced and results in 9.12 kWh of total energy. Accumulated total or thermal energy for the Stirling engine can also be recorded.

TABLE 2

Stirling Engine Generating Power Under Different Operating Conditions
(note: temperature unit conversion from ° C. to ° F. may
be determined by ° F. = 1.8* ° C. + 32)

| No | Engine Head Temp (° C.) | Biomass Chamber Temperature Channel 2 (° C.) | Power (Electricity) (Watts) | Engine Coolant Flow Rate (liters/min) | Inlet Coolant Temp (° C.) | Outlet Coolant Temp (° C.) | Total or Thermal Energy (kWh) |
|---|---|---|---|---|---|---|---|
| 1 | 220 | 850 | 180 | 10 | 21.7 | 21.9 | 7.68 |
| 2 | 250 | 896 | 238 | 10 | 77.8 | 73.4 | 7.69 |
| 3 | 300 | 916 | 348 | 10 | 24.8 | 25.3 | 7.72 |
| 4 | 350 | 963 | 449 | 10 | 28.1 | 29 | 7.78 |
| 5 | 400 | 995 | 553 | 10 | 32 | 33.4 | 7.87 |
| 6 | 450 | 1000 | 642 | 10.1 | 32.5 | 36.1 | 7.98 |
| 7 | 500 | 1022 | 703 | 10.1 | 32.7 | 36.8 | 8.24 |

TABLE 2-continued

Stirling Engine Generating Power Under Different Operating Conditions
(note: temperature unit conversion from ° C. to ° F. may
be determined by ° F. = 1.8* ° C. + 32)

| No | Engine Head Temp (° C.) | Biomass Chamber Temperature Channel 2 (° C.) | Power (Electricity) (Watts) | Engine Coolant Flow Rate (liters/min) | Inlet Coolant Temp (° C.) | Outlet Coolant Temp (° C.) | Total or Thermal Energy (kWh) |
|---|---|---|---|---|---|---|---|
| 8 | 525 | 1062 | 739 | 10.1 | 33.7 | 37.6 | 8.56 |
| 9 | 530 | 1090 | 758 | 10.1 | 34 | 37.9 | 8.77 |
| 10 | 530 | 1109 | 767 | 10.1 | 34.1 | 37.9 | 8.79 |
| 11 | 535 | 1154 | 772 | 10.1 | 34.2 | 38.2 | 8.82 |
| 12 | 540 | 1186 | 782 | 10.1 | 36 | 40.4 | 8.88 |
| 13 | 550 | 1201 | 808 | 10.1 | 34.9 | 43.8 | 8.92 |
| 14 | 560 | 1237 | 875 | 10.1 | 33.9 | 47.1 | 8.98 |
| 15 | 570 | 1282 | 855 | 10.1 | 33.7 | 49.8 | 9.02 |
| 16 | 580 | 1310 | 880 | 10.1 | 31.5 | 53.3 | 9.12 |

Figure 14:
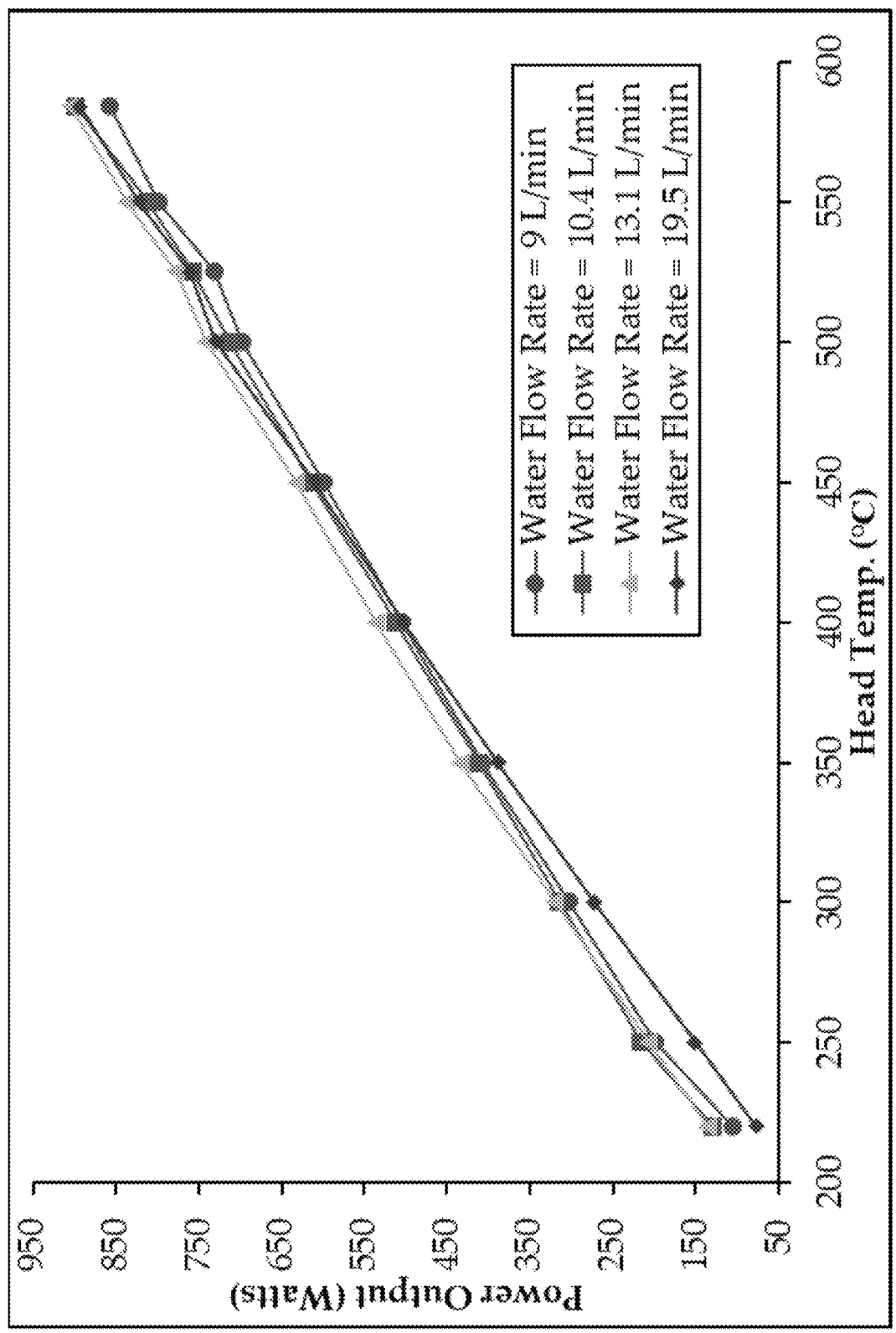
FIG. 14 is a chart showing power output as a function of heat engine temperature varying flow rates in the system of FIG. 12.

Electricity outputs of the Stirling engine were determined by the difference between heat absorption of working fluid (i.e., helium) from the biomass (i.e., poultry litter) combustion process and heat rejection through the cooling process of coolant. Based on preliminary tests and findings, head control temperatures and water flow rates of Stirling engine 900 were determined to be important indicators of the heat absorption during the biomass combustion and heat rejection during the cooling process. As shown in FIG. 14, electricity outputs were measured at water flow rates of 9.1, 10.4, 13.1 and 19.4 L/min, along with various engine head temperatures from 428° F. or 220° C. to 1083° F. or 584° C. to further evaluate the performance of Stirling engine 900. Experimental results indicated that the electricity output linearly increased with engine head control temperature of the Stirling engine 900, while the head temperature was increased by increasing surrounding chamber temperature at a height of 15 in. (about 381.0 mm) above the primary air distributor. When the Stirling head control temperature was lower than 662° F. or 350° C., the minimum threshold of electricity output was found at a water flow rate of 19.5 L/min. This confirmed that heat rejection at a water flow rate of 19.5 L/min was more than the required cooling of the working gas during electricity production. However, when the Stirling engine head control temperature increased to 752° F. or 400° C., the minimum threshold of electricity output was found to be at a water flow rate of 9.0 L/min. A possible reason may be that the water flow rate of 9.0 L/min was too low to provide enough cooling of the working fluid at Stirling engine 900. These results infer that either high (19.5 L/min) or low (9.0 L/min) water flow rate was not appropriate to provide sufficient cooling of the working fluid on Stirling engine 900 and provide optimal electricity output during the poultry litter and natural gas co-combustion process. Based on test and evaluation process, it was found that the lab-scale biomass conversion system requires an optimal water flow rate of 13.1 L/min to effectively cool the Stirling engine 900 within the acceptable cooling temperature to prevent melting of engine parts and produce relatively high electricity output, and thereby improve the overall efficiency of system performance. At a water flow rate of 13.1 L/min, the electricity output reached a maximum value of 905 watts at a Stirling engine head control temperature of 1083° F. or 584° C.

Figure 15:
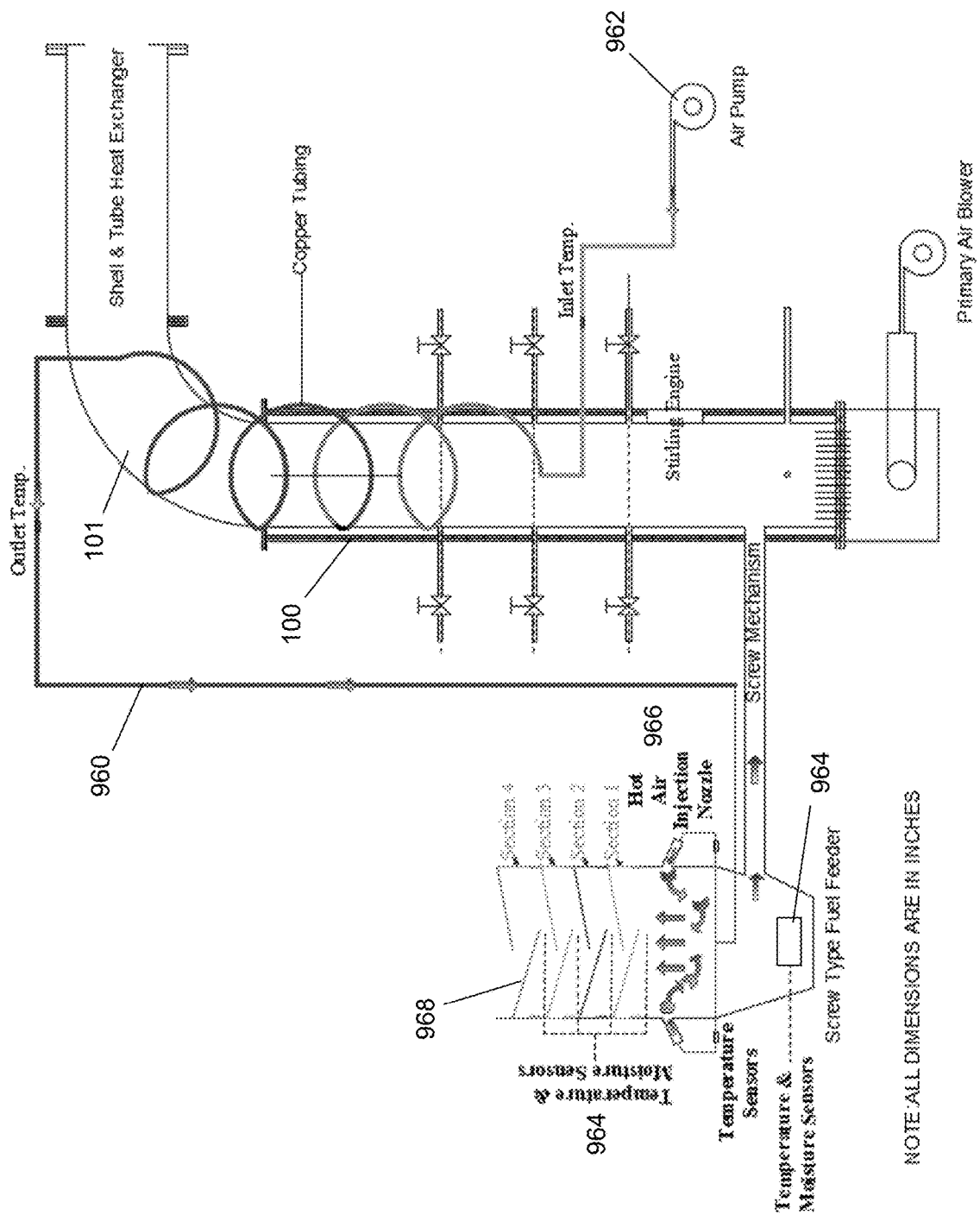
FIG. 15 is a schematic view of the system of FIG. 1 and including a system for heating biomass fuel prior to its delivery to the combustion chamber.

Optionally, residual heat from combustion chamber 100 that is produced during the combustion process may be applied to drying of the biomass (i.e., poultry litter) before being processed in the system itself, thus reducing the existing moisture content and contributing to improved combustion efficiency. As shown in the schematic view of the combustion system of FIG. 15 and in accordance with further aspects of an embodiment of the invention, the system may include a direct drying process that precedes the combustion chamber 100, which direct drying process may be used to pre-dry the biomass (e.g., poultry litter) in the fuel feeder 102 using hot air from combustion chamber 100 to reduce the moisture content of the biomass/fuel and improve its combustion efficiency. Such direct drying process may be monitored and controlled so as to increase its efficiency and reduce gas emissions.

The direct drying process is generally comprised of copper tubes 960, an air pump 962, a moisture detection sensor 964, and thermocouples. Copper tube 960 is wrapped around combustion chamber 100 and the 90-degree elbow section 101 to absorb heat from the outer surface of combustion chamber 100 and 90-degree elbow section 101 into copper tube 960. The 90-degree elbow section 101 is particularly included as a heat transfer source for the system as a higher quantity of heat is radiated from its outer surface, due to the fact that such 90-degree elbow section 101 need not include a ceramic layer on the inner wall, as would typically be the case in combustion chamber 100.

Air pump 962 supplies cold air that travels through copper tube 960 to absorb heat and become hot air. The end of copper tube 960 is connected to preferably four individual hot air injection nozzles 966, with one such nozzle 966 positioned on each side of fuel feeder 102. Each individual hot air injection nozzle 966 includes several holes to effectively supply air into the fuel feeder 102. Thus, hot air is transported from copper tube 960 and split into four lines, causing hot air to be circulated in feeder 102. Additionally, copper tube 960 may optionally include insulation so as to avoid heat loss. Inlet and outlet air temperatures and air velocity in copper tube 960 may be measured and monitored to monitor the amount of heat absorption.

A preferably rectangular, clear, and plastic hopper with a sieve may be provided on top of fuel feeder 102 to remove any stray materials (e.g., rocks and the like) and to feed the poultry litter into fuel feeder 102. A plurality of inclined boards 968 may be provided in the plastic hopper to feed poultry litter slowly and to reduce vertical weight and pressure during the feed operation. A biomass moisture sensor and thermocouple 964 measures the initial moisture content and temperature of the poultry litter as it enters the plastic hopper. Both the poultry litter and the hot air move counter-current (i.e., hot air flowing in an upward direction while the fuel flows downward) to maximize heat transfer rate. Upon contact, the hot air works to reduce and remove moisture present in the poultry litter. Using another similarly configured thermocouple and moisture sensor 964, temperature and moisture content may likewise be measured after the drying process using weight changes. The resulting difference in temperature and moisture content then establishes the effectiveness of the drying process and may be used to adjust the process to achieve a desired level of drying of the poultry litter.

An experimental prototype drying system was first evaluated via computer simulation using Simprosys software, a WINDOWS-based software package available from Simprotek Corporation. That simulation software provides an integrated, powerful, yet highly user-friendly and contemporary tool for the design and simulation of dryer flow sheet and drying systems.

For a continuous convective dryer, the material and heat balance equations are as follows:

$$Wg(Yo - Yi) = Ws(Xi - Xo)$$

$$dQ = \frac{dm\_hot\_gas}{dt} * Cp\_hot\ gas * (Ti - To)$$

The drying process efficiency was measured using the Thermal Efficiency and the Specific Heat consumption (or thermal energy) of the simulated dryer with governing equations contained in the simulation software. The drying process was simulated for moisture content reduction from 22 wt. % to 15 wt. % using the following factors specified in Table 3:

TABLE 3

Simulation Factors

| Poultry Litter | Hot Air |
|---|---|
| Feed moisture content = 0.22 kg/kg wb | Inlet Temperature (Dry Bulb) = 60-90° C. |
| Feed Temperature = 20° C. | Inlet Pressure = 101.3 kPa |
| Product Temperature = 50° C. | Initial absolute humidity = 0.009 kg/kg |
| Mass Flow Rate = 10 kg/h | Air Velocity = 0.5-1.0 m/s |

Table 3: Simulation Factors

Then, emission results, combustion efficiency, and temperature distribution during the poultry litter combustion process were monitored and recorded under the proposed drying process. Experimental results were gathered from the poultry litter sample that did not go through the drying process. These results were compared with previous test results to identify the benefit of the drying process for the system performance.

Because of the high moisture content of poultry litter, there was some uncertainty as to whether steady and complete combustion of poultry litter alone could be maintained. Co-firing of poultry litter with fossil fuels (i.e., coal) is considered as a feasible means to address the energy supply issues and aid in the solution of air pollution control problems. But there is a large amount of increasing poultry litter production and challenges of transporting poultry litter to the existing coal power plants, such as lower energy density, decentralized farms, and high transportation costs. There is thus a need for reducing moisture content and burning poultry litter alone on the poultry farm sites.

In an experimental implementation, a ⅛ inch diameter spiral copper tube was used to absorb heat from hot water, with cold air blown from one end of the tube, such that the air gained heat in the pipe from the hot water to mimic the flue gas during the poultry litter combustion process. Then, the processed hot air was transferred into poultry litter material held in a container. This was a form of forced convective heat transfer. In the experimental setup, hot water was placed in an aluminum plate and lost its temperature to the surrounding environment, such that the hot air temperature could not be controlled. Thus, the team designed a calorimeter using a Styrofoam box to reduce heat loss. This helped to maintain a relatively constant hot water temperature. The experiment carried out is summarized in Table 4.

TABLE 4

Experimental Results fof Drying Process

Drying Time = 5 mins, Air Velocity = 1.7 m/s,
Air Pump Pressure = 15 psi

| Parameters | Test 1 | Test 2 | Test 3 |
|---|---|---|---|
| Initial weight of Sample (Poultry Litter) | 50 g | 50 g | 50 g |
| Amount of water added | 7.33 g | 6.38 g | 6.27 g |
| Total sample weight with water | 57.33 g | 56.38 g | 56.27 g |
| Heating material | Aluminum Plate | Styrofoam box | Styrofoam box |
| Initial Feed temp | 82° F. | 85° F. | 88° F. |
| Initial Water Temp | 187° F. | 184° F. | 162° F. |
| Final Water Temp | 149° F. | 167° F. | 148° F. |
| Final Feed Temp | 88° F. | 95° F. | 104° F. |
| Air Temp in drying material | 104° F. | 113° F. | 122° F. |
| Final weight of sample with water | 57.13 g | 55.46 g | 54.55 g |

The foregoing results show the feasibility of using heat transferred from a source, such as combustion chamber 100 (obviously operating at much higher temperatures than those in the above experiment) to cold forced air through a copper tube, and delivered hot forced air to moist poultry litter in order to reduce moisture to, in turn, improve combustion efficiency in combustion chamber 100.

As discussed above, monitoring and control system 160 may control the amount of biomass fuels delivered to combustion chamber 100 (e.g., control the feeder's rate (in RPM) with a Programmable Logic Controller (PLC)), to a blower 112 to control the amount of air delivered through primary air distribution and delivery system 110 and through secondary air distribution and delivery system 130 (e.g., through fan control with the PLC), and preferably to valves 114 to allow independent control of the amount of air delivered through such systems 110 and 130 with respect to one another.

Figure 16:
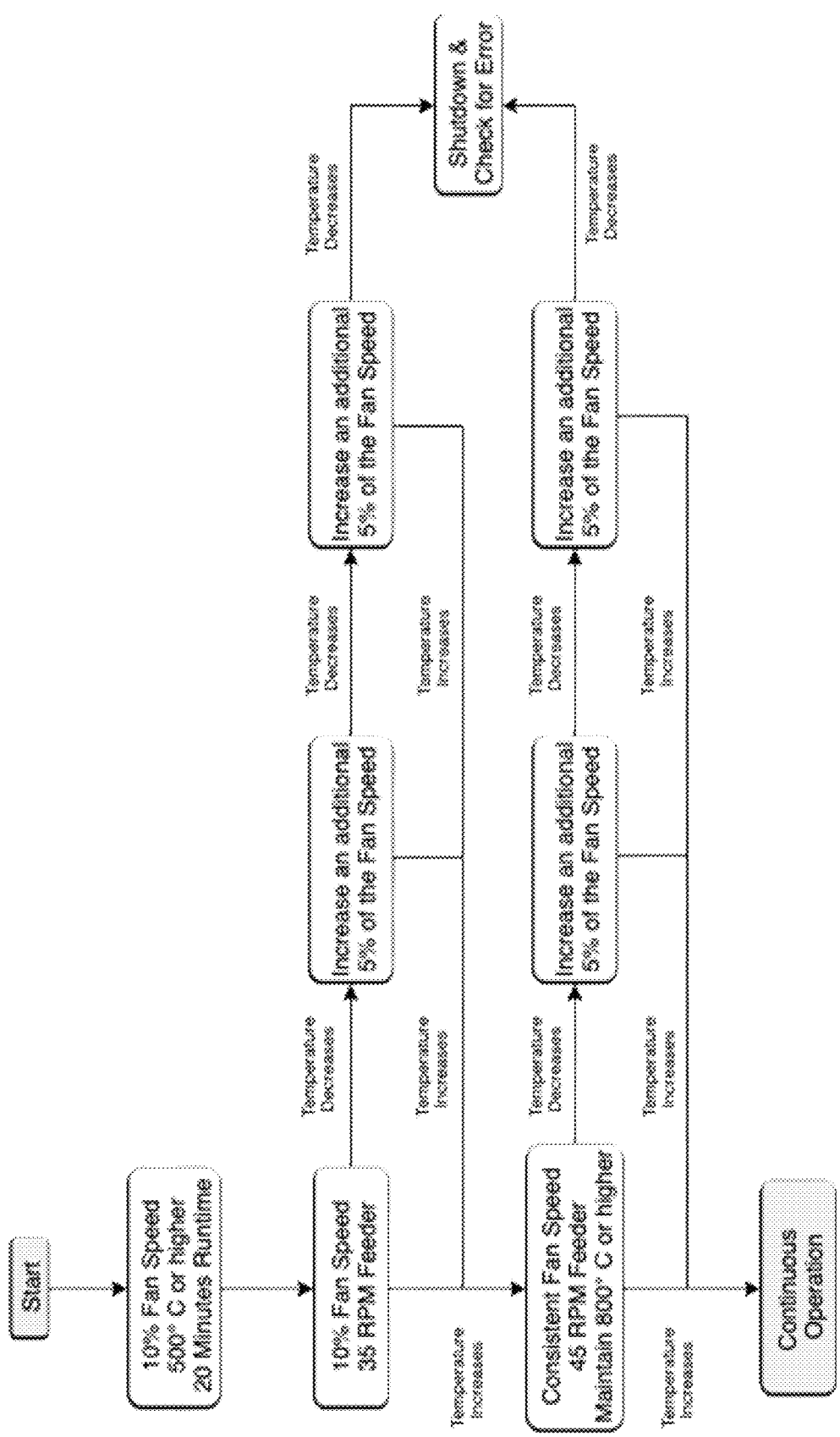
FIG. 16 is a flowchart depicting the logical program flow of a programmable logic controller (PLC) in a control system for use in the system of FIG. 1.
Figure 17:
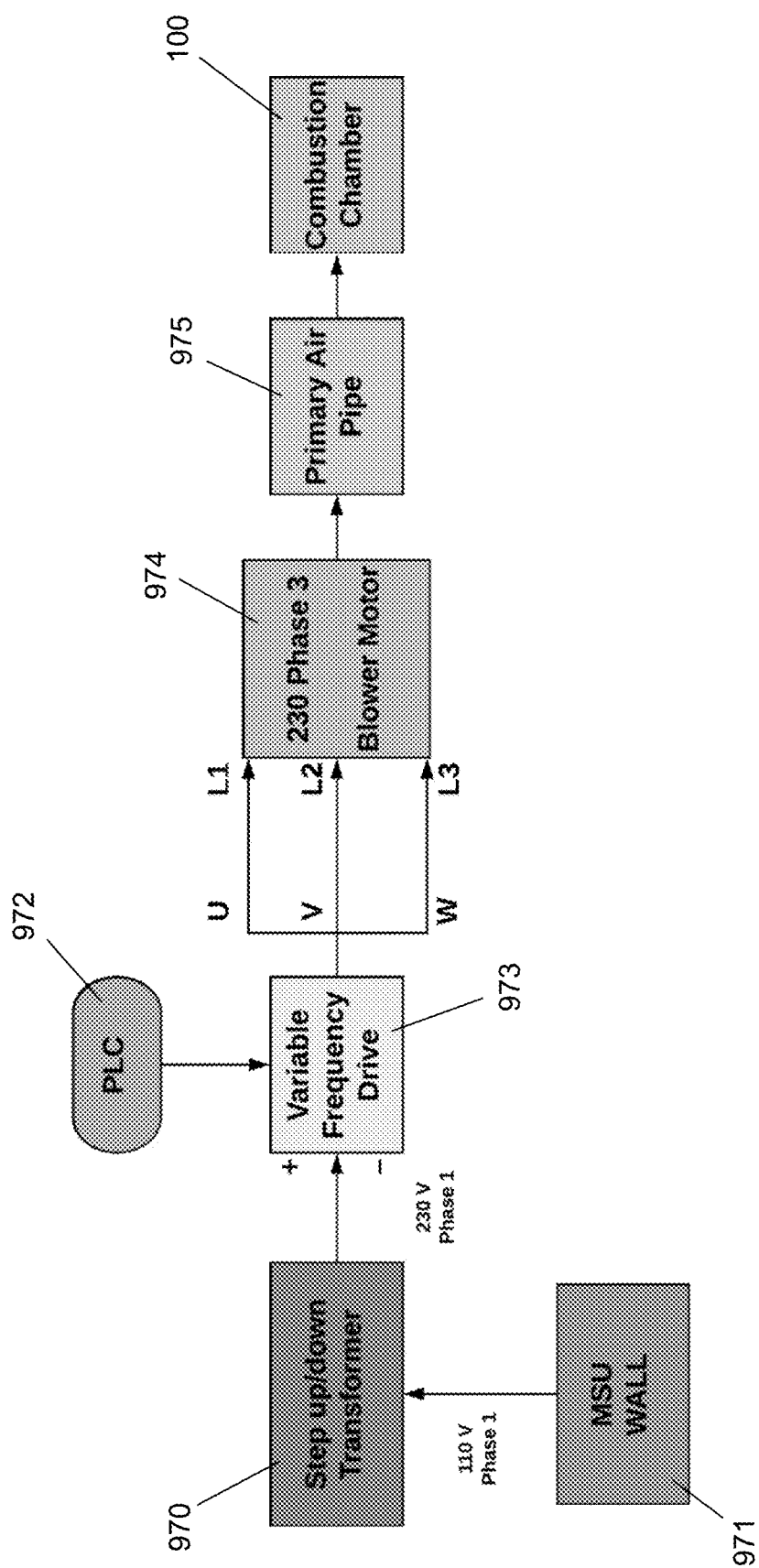
FIG. 17 is a flowchart depicting the direction of control signals from a PLC in a control system for use in the system of FIG. 1.

FIG. 16 is a flowchart showing the logical control of the combustion process using a PLC. The goal of such process is to continue adjusting the fan speed every time the temperature drops than desired combustion temperature, as well as the feeder's rate under a steady increase in temperature inside of combustion chamber 100. However, if the temperature is able to reach the desired temperature, e.g., 800° C. or higher, then the operation will run continuously for 20 minutes or more. In general, the PLC may be used to control the feed rate of biomass fuel from the feeder 102 and air flow based on temperature changes detected by thermocouple sensors. FIG. 17 is a schematic view of the PLC control circuit, in which a step up/down transformer 970 may be provided to step up the regular power supply from a wall power outlet 971. Once the temperature is detected by the temperature sensor, the control system computer sends program codes to a communication module. Then, the PLC CPU 972 transfers the signal to an analog I/O module, which in turn transfers the signal to a variable frequency drive (VFD) 973 for the air blower 974 to control the air flow rate. In an exemplary configuration, a 230V 3-phase blower 974 is connected to VFD 973, which receives 230V single phase from transformer 970. Blower 974 may have 9 lines encrypted as T1-T9 for lead connection depending on input voltage, whether 230V (low voltage) or 460V (high voltage). Likewise, PLC CPU 972 sends another analog signal to the analog I/O module and fuel feeder 102 for controlling the fuel feeding rate.

The foregoing system may be used to process a wide variety of biomass materials, including (by way of non-limiting example) poultry litter, municipal solid waste, agricultural waste, algae waste, biomedical hazard waste, and the like. Moreover, sawdust, wood chips, wood pellets, switch grass, dried leaves, corn husks, rice shells, and such other biomass materials as may be selected by those skilled in the art may similarly be processed by the foregoing system to produce high heat and energy.

The foregoing system may be particularly well suited to processing of poultry litter. While total poultry litter production on a given poultry farm will determine feed rate of materials to combustion chamber 100, in a particularly preferred configuration, poultry litter may be directed to combustion chamber 100 at a feed rate of 40-60 lb/hr to process a single poultry farm's waste (about 300 tons/year with 3 poultry houses). Operating at a schedule of 20 hours/day, 6 days/week, and 52 weeks/year, such a feed rate can process approximately 300,000 pounds of poultry litter each year. In processing such poultry litter (as well as other biomass materials), it will be important to monitor and regulate moisture of the feedstock to ensure proper combustion in combustion chamber 100. Particularly for poultry litter, a desired practical moisture level is between 15% and 35%, and above this range, pre-drying will be required for combustion to proceed efficiently in combustion chamber 100. Of course, feedstock may certainly have a lower moisture content and achieve proper combustion in combustion chamber 100, such that an overall operational target is for moisture content of any biomass material to be generally below 35%.

Figure 7:
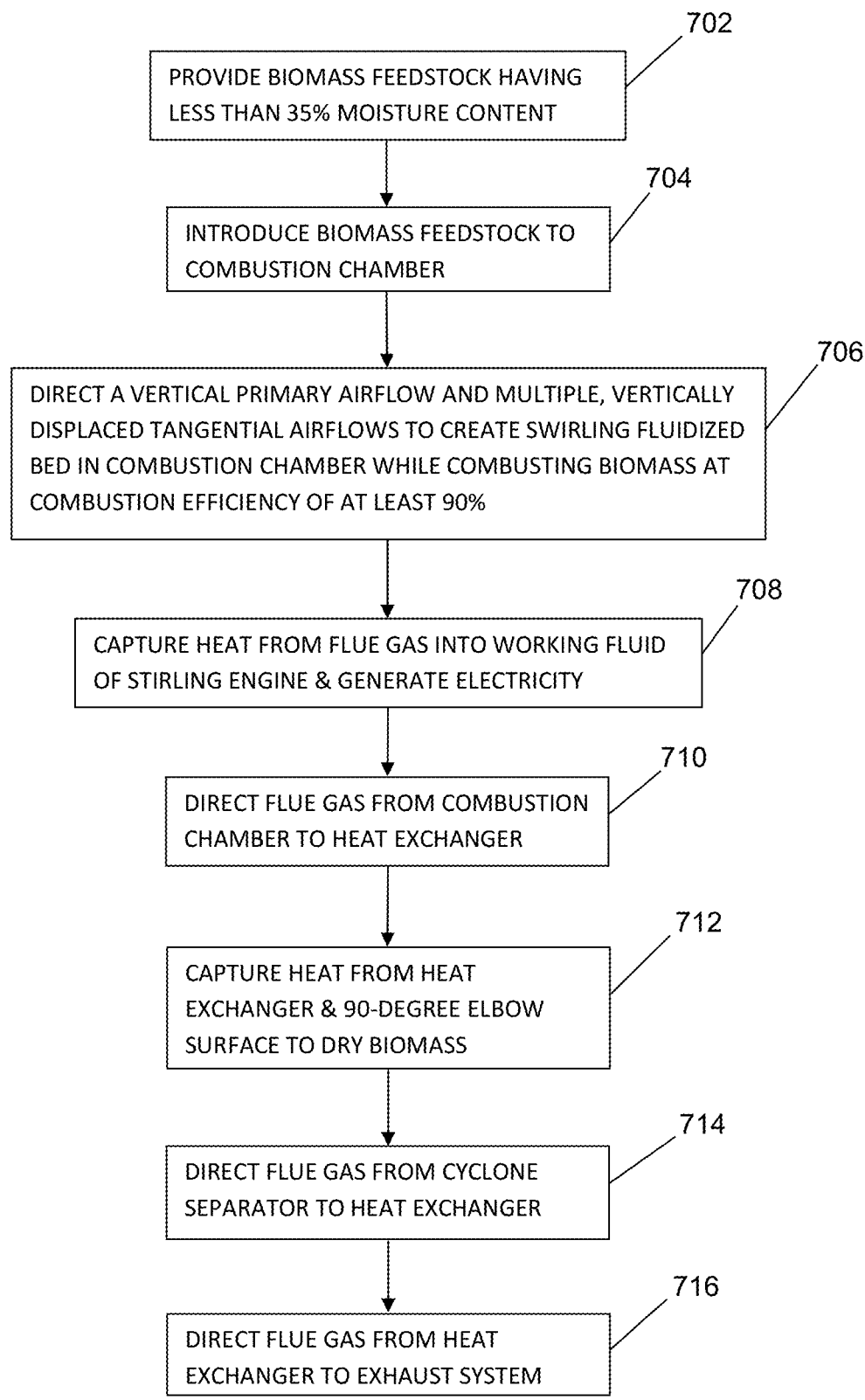
FIG. 7 is a flowchart depicting a method for burning biomass in accordance with certain aspects of an embodiment of the invention.

In accordance with certain aspects of the invention, a method for processing biomass material may comprise the steps shown in FIG. 7. At step 702, biomass feedstock is provided having a moisture content that is general less than 35%. In the event that such biomass has a moisture content higher than 35%, predrying of such biomass material should be carried out to reduce the moisture content. Next, at step 704, such biomass material is introduced into a combustion chamber 100 of a biomass combustion system configured as detailed above. As the biomass material is being introduced into combustion chamber 100, as noted at step 706, a vertical primary airflow is directed into combustion chamber 100, while multiple, vertically displaced tangential airflows are introduced into combustion chamber 100, so as to create a swirling fluidized bed of the biomass particles in combustion chamber 100, with the biomass particles being combusted at a combustion efficiency of at least 90%. At step 708, heat generated from the biomass combustion process is carried in the form of flue gas and a portion of heat may be transferred into the working fluid of a Stirling engine to generate electricity and hot water. Then, the flue gas enters 90-degree elbow section 101 and at step 710 is directed toward heat exchanger 400 from combustion chamber 100. At step 712, heat may be captured from the surface of heat exchanger 400 and 90-degree elbow section 101 to perform the process of pre-drying of biomass. At step 714, flue gas from the heat exchanger 400 is directed to a cyclone separator configured as above, where any unburned waste and particles that were unburned in the combustion chamber are burned completely, and flying ash is divided and collected in a container connected to the cyclone separator, while dioxin production is significantly minimized if not altogether eliminated. The collected ash and char may thereafter optionally be used as fertilizer. Next, at step 716, the system exhaust (in the form of high temperature flue gas) is directed to the exhaust system with significantly reduced noxious emissions, and more particularly having $NO_x$ of less than 80 ppm, $SO_x$ of less than 20 ppm, $CO_2$ of less than 2%, and particulate matter content of less than 3 lb/MM Btu.

In accordance with the foregoing method, heat captured from the flue gas is thus put to useful energy, such as by generating steam for delivery to a turbine, powering a Stirling engine, or other such other energy generation devices as may be apparent to those skilled in the art, or for direct heating of process materials, such as water, feed stock (for drying the same), or the like, or such other direct heat application processes as may be apparent to those skilled in the art.

EXAMPLE 1

A lab-scale prototype of the system described above was designed and built by the Lee Research Group at The Center for Advanced Energy Systems and Environmental Control Technologies (CAESECT) at Morgan State University in Baltimore, Maryland. The lab prototype system can process 11-24 lb/hr of pre-dried poultry litter with high combustion efficiency (over 96%) without bed materials. The poultry litter was burned in a well-controlled environment at a temperature low enough (1,400-2,100° F.) to avoid formation of nitrogen oxides, but high enough to avoid agglomeration and slagging in the ash. Milestones for efficiency, ultra-clean emissions, and particular matter were set as follows: $NO_x$ (30-80 ppm), $SO_x$ (15-20 ppm), $CO_2$ (1.5-2.0%), and particulate matter (2.0-2.5 lb/MM Btu). The residual fly ash (i.e., phosphate $P_2O_5$ and potassium, $K_2O$) is a high value fertilizer. The results produced from the prototype configuration indicate improved performance characteristics over other combustion technologies, as shown in Table 5 below.

TABLE 5

Comparison of System with Other Combustion Technologies

| | Stoker* | BFBC* | CFBC* | System According to Aspects of the Invention |
|---|---|---|---|---|
| Firing Capacity | Small/Medium | Small/Medium | Medium/Large | Small/Medium |

TABLE 5-continued

Comparison of System with Other Combustion Technologies

|  | Stoker* | BFBC* | CFBC* | System According to Aspects of the Invention |
|---|---|---|---|---|
| Combustion Efficiency (%) | =80% | 80-90% | 85-94% | Above 95% |
| $SO_x$ Removal in combustor | None | Sorbent in bed | Sorbent in bed/freeboard | Optional |
| $NO_x$ Emissions | High | Low | Very low | Very low |
| Ash Form | Bottom ash | Bottom ash | Bottom ash | Fly ash |
| Combustion Temperature (° C.) | 1,300 | 850-950 | 850-1000 | 850-1,250 |
| Primary Air Fraction (%) | 100 | 100 | >80 | 10-50 |
| Mean Gas-Particle Slip Velocity (m/s) | None | 0.2 | 0.5-1.0 | 1-5 |
| Turbulence in Combustor | None | Good | Excellent | Excellent |

*Stoker-Fired Combustor, BFBC-Bubbling Fluidized Bed Combustor (FBC), CFBC-Circulating FBC, SFBC In order to achieve the foregoing benefits, the prototype system was configured as detailed in Table 6 below:

Combustor Dimensions

|  | Component Description | Units (in) | Units (cm) |
|---|---|---|---|
| 1 | Combustor Outer Diameter ($d_{cod}$) | 15.12 | 38.4048 |
| 2 | Combustor Internal Diameter ($d_{cid}$) | 13.72 | 34.8488 |
| 3 | Refractory Material Thickness ($t_r$) | 0.7 | 1.778 |
| 4 | Fuel Feeder Diameter ($d_f$) | 2.9 | 7.366 |
| 5 | Primary Air Inlet Diameter ($d_p$) | 3.5 | 8.89 |
| 6 | Secondary Air Inlet Diameter ($d_s$) | 0.46 | 1.1684 |
| 7 | Total Combustor Height (H) | 74 | 187.96 |
| 8 | Air Box Height ($H_a$) | 13 | 33.02 |
| 9 | Combustion Chamber Height ($H_c$) | 61 | 154.94 |

The prototype configuration was provided one primary port and 12 secondary ports. The primary air was injected from the bottom of the chamber. The heights of secondary air nozzles were 34, 45 and 55.5 inches from the primary air distributor, respectively. The feeding rate for the prototype configuration was 11-24 lb/hr. The air flow rate for primary air was 49-110 cubic feet per minute (cfm), and for secondary air was 6-16 cfm. The temperature during poultry litter combustion was between 1,400-2,100° F., which achieved up to 97% combustion efficiency. The measured emissions from the combustion chamber were 0-23 ppm $NO_x$, 0-19 ppm $SO_x$, 0-1.7% $CO_2$, and particular matter of 0.45-1.19 lb/MM Btu, achieving a combustion efficiency of up to 97%.

A system and method implemented in accordance with the above disclosure provides significant opportunity for the clean disposal of biomass with the added advantage of power and hot water generation. The total number of farms in the U.S. producing poultry products, including broilers, breeders and egg layers is estimated at 99,700. Of this total, approximately 30,000 broiler farms account for 95% of broiler production in the U.S., with 6%-7% of broiler production generated in the Delaware-Maryland-Virginia region, with 2,700 broiler farms. The U.S. accounts for 20% of the world's broiler production, while European Union countries account for 12% (60% of U.S.). The current projections for both the small-scale farm unit and a large-scale regional unit configured as described above would generate energy to the grid that is currently estimated to be able to pay back the capital cost in 3.5 years. This does not include any environmental credits/funding, or the value of cost for bio-waste disposal.

Longer-term markets would include any agricultural industry where biomass is generated and must be disposed of in a clean, cost-efficient manner (including, by way of non-limiting example, pork and meat production industries, rice straw, rice husk, wheat straw, corn stalk, and post algal processed (oil-extracted) biomass). In addition, algae is an interesting source of bio-energy for its concentration of oil. Currently, after oil extraction, the remaining algal biomass can be dried, pelletized, and used as fuel that is burned in industrial boilers and other power generation systems. The system and method described herein may be suitable to decrease costs of generating energy from the remaining algal biomass, increasing the market potential for the technology.

Moreover, the system and method described herein are believed to provide significant improvement over conventional direct combustion technologies. For example, for bubbling fluidized bed combustion, high pressure air is fed through the bottom of the boiler with lower fluidization velocity which causes a bubbling effect and allows most of the bed material to be retained in the lower furnace. For circulating fluidized bed combustion, high-pressure air suspends the bed material and fuel particles, which can rise up the chamber into the cyclone. Heavy particles will fall into the cyclone hopper and be returned to the furnace to be used again. For conventional swirling fluidized bed combustion, secondary air ports provide a swirling flow environment for combustion in an effort to increase the particle residence time and reduce unburned particles. However, the system and method described herein and employed in accordance with the invention provides multiple levels of secondary air injection nozzles, with optimized configurations for both primary air injection nozzles and secondary air injection nozzles, which features optimize the ability to control the combustion process and achieve higher combustion efficiencies (with resulting lower noxious emissions) than such previously known systems. As demonstrated in the initial test results (above), the system and method disclosed herein also 1) provides efficient burning at controlled temperatures which reduces $NO_x$ and particulate emissions, 2) supplies sufficient secondary air and extended swirling air to burn fuels in the upper part of combustion chamber with high efficiency, 3) mixes fuel and combustion air quickly and uniformly, and 4) provides large gas-particle slip motion which prolongs particle residence time and allows a reduction in chamber size and thus the cost of the system.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A system for fluidized bed combustion, comprising:
   a combustion chamber, said combustion chamber further comprising:
   a primary air distribution and delivery system configured to provide vertical airflow through said combustion chamber, wherein said primary air distribution and delivery system further comprises a plurality of nozzles, each said nozzle comprising a curved head, a first branch extending downward from said curved head, a lower second branch having a widening diameter as said lower branch extends away from said first branch, a plurality of first outlets extending outward from said first branch, and a plurality of second outlets extending outward from said lower branch; and a secondary air distribution and delivery system configured to provide a plurality of vertically displaced, horizontally aligned, tangential airflows in said combustion chamber;

a biomass feeder in communication with an interior of said combustion chamber and positioned to deliver biomass material to said interior of said combustion chamber at a location above said primary air distribution and delivery system and below said secondary air distribution and delivery system; and a shell tube and heat exchanger comprising a plurality of twisted tubes, a plurality of baffles, and a cylindrical shell around said twisted tubes and said baffles, wherein said shell tube and heat exchanger receives flue gas from said combustion chamber and is configured to collect heat from said flue gas as it flows through said cylindrical shell.

2. The system of claim 1, wherein said baffles are positioned at an inclined angle with respect to said twisted tubes.

3. The system of claim 2, wherein said inclined angle is 40°.

4. The system of claim 1, wherein each baffle has at least one and fewer than all tubes of said plurality of twisted tubes extending therethrough.

5. The system of claim 1, wherein said baffles in said shell define a non-linear flow path of said flue gas as it travels through said cylindrical shell.

6. The system of claim 1, further comprising a closed space having at least one radiator in fluid communication with said shell tube and heat exchanger.

7. The system of claim 6, wherein said at least one radiator further comprises a plurality of radiators arranged in parallel in a closed fluid system including said plurality of radiators and said shell tube and heat exchanger.

8. The system of claim 6, wherein said closed space further comprises a housing space housing a source of biofuel processed by said system.

9. The system of claim 1, further comprising a heat engine in thermal contact with said combustion chamber and configured to generate electrical power and heat energy from heat generated inside of said combustion chamber.

10. The system of claim 1, further comprising a fuel drying system, said fuel drying system further comprising:
an air conduit wrapping around and in thermal contact with said combustion chamber and a blower at an inlet of said air conduit, said air conduit having a plurality of outlets with an air injection nozzle at each said outlet and positioned to transfer heat from said combustion chamber to biomass prior to entry of said biomass into said combustion chamber.

11. The system of claim 1, further comprising a control system configured to, in response to temperature levels detected in said system, control an airflow of said primary air and said secondary air, and control a rate of delivery of biomass to said combustion chamber.

12. A system for fluidized bed combustion, comprising:
a combustion chamber, said combustion chamber further comprising:
a primary air distribution and delivery system configured to provide vertical airflow through said combustion chamber, wherein said primary air distribution and delivery system further comprises a plurality of nozzles, each said nozzle comprising a curved head, a first branch extending downward from said curved head, a lower second branch having a widening diameter as said lower branch extends away from said first branch, a plurality of first outlets extending outward from said first branch, and a plurality of second outlets extending outward from said lower branch; and a secondary air distribution and delivery system configured to provide a plurality of vertically displaced, horizontally aligned, tangential airflows in said combustion chamber;

a biomass feeder in communication with an interior of said combustion chamber and positioned to deliver biomass material to said interior of said combustion chamber at a location above said primary air distribution and delivery system and below said secondary air distribution and delivery system; and a heat engine in thermal contact with said combustion chamber and configured to generate electrical power and heat energy from heat generated inside of said combustion chamber.

13. The system of claim 12, said heat engine having an outlet directing heated water to a radiator.

14. The system of claim 13, said radiator having a radiator outlet directing water to a storage tank.

15. The system of claim 14, further comprising a circulating pump positioned to pump water from said storage tank back to said heat engine, and a control valve positioned between said circulating pump and said heat engine.

16. The system of claim 12, wherein said heat engine is a Stirling engine.

17. A system for fluidized bed combustion, comprising:
a combustion chamber, said combustion chamber further comprising:
a primary air distribution and delivery system configured to provide vertical airflow through said combustion chamber, wherein said primary air distribution and delivery system further comprises a plurality of nozzles, each said nozzle comprising a curved head, a first branch extending downward from said curved head, a lower second branch having a widening diameter as said lower branch extends away from said first branch, a plurality of first outlets extending outward from said first branch, and a plurality of second outlets extending outward from said lower branch; and a secondary air distribution and delivery system configured to provide a plurality of vertically displaced, horizontally aligned, tangential airflows in said combustion chamber;

a biomass feeder in communication with an interior of said combustion chamber and positioned to deliver biomass material to said interior of said combustion chamber at a location above said primary air distribution and delivery system and below said secondary air distribution and delivery system; and a fuel drying system, said fuel drying system further comprising:
an air conduit wrapping around and in thermal contact with said combustion chamber and a blower at an inlet of said air conduit, said air conduit having a plurality of outlets with an air injection nozzle at each said outlet and positioned to direct heat from said combustion chamber to biomass prior to entry of said biomass into said combustion chamber.

18. The system of claim 17, wherein said air conduit further wraps around an elbow conduit above said combustion chamber and that transfers flue gas downstream in said system, wherein said elbow conduit exhibits a higher level of heat transfer from an interior of said elbow conduit to an exterior of said elbow conduit than said combustion chamber transfers heat from an interior of said combustion chamber to an exterior of said combustion chamber.

19. The system of claim 17, further comprising a hopper positioned above said biomass feeder and positioned to direct moist biomass into said fuel feeder.

20. The system of claim 19, wherein said air injection nozzles are positioned with respect to said hopper to expose moist biomass in said hopper to heated air so as to reduce moisture in said moist biomass.

\* \* \* \* \*